(12) United States Patent
Okazaki

(10) Patent No.: US 8,725,295 B2
(45) Date of Patent: May 13, 2014

(54) ROBOT, ROBOT CONTROL APPARATUS, ROBOT CONTROL METHOD, AND ROBOT CONTROL PROGRAM

(71) Applicant: Panasonic Corporation, Osaka (JP)

(72) Inventor: Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/759,289

(22) Filed: Feb. 5, 2013

(65) Prior Publication Data

US 2013/0151009 A1 Jun. 13, 2013

Related U.S. Application Data

(63) Continuation of application No. PCT/JP2012/001824, filed on Mar. 15, 2012.

(30) Foreign Application Priority Data

Mar. 17, 2011 (JP) ................................. 2011-058629

(51) Int. Cl.
G05B 19/00 (2006.01)
(52) U.S. Cl.
USPC ......................................................... 700/260
(58) Field of Classification Search
None
See application file for complete search history.

(56) References Cited

U.S. PATENT DOCUMENTS

| | | | |
|---|---|---|---|
| 6,394,731 B1 | 5/2002 | Konosu et al. | |
| 2009/0105880 A1* | 4/2009 | Okazaki | 700/258 |
| 2009/0171505 A1* | 7/2009 | Okazaki | 700/258 |
| 2010/0087955 A1* | 4/2010 | Tsusaka et al. | 700/245 |
| 2010/0114371 A1* | 5/2010 | Tsusaka et al. | 700/250 |
| 2010/0161127 A1* | 6/2010 | Abdallah et al. | 700/258 |
| 2010/0286826 A1* | 11/2010 | Tsusaka et al. | 700/254 |
| 2011/0015785 A1* | 1/2011 | Tsusaka et al. | 700/254 |
| 2011/0093120 A1* | 4/2011 | Ando et al. | 700/260 |

(Continued)

FOREIGN PATENT DOCUMENTS

| | | |
|---|---|---|
| JP | 2003-81599 | 3/2003 |
| JP | 3504507 | 3/2004 |

(Continued)

OTHER PUBLICATIONS

International Preliminary Report on Patentability and Written Opinion of the International Searching Authority issued Oct. 31, 2013 in International (PCT) Application No. PCT/JP2012/001824.

(Continued)

*Primary Examiner* — Khoi Tran
*Assistant Examiner* — Robert Nguyen
(74) *Attorney, Agent, or Firm* — Wenderoth, Lind & Ponack, L.L.P.

(57) ABSTRACT

A robot includes a multi-joint robot arm, an external force acquiring unit arranged at the multi-joint robot arm to acquire an external force, and an impedance control unit that causes the multi-joint robot arm to operate as a virtual spring-mass-damper system based on the external force acquired by the external force acquiring unit. The impedance control unit has an impedance map storage unit that defines impedance parameters at each of points of the work region, and an impedance map variable unit that changes the distribution of the impedance parameters in the impedance map storage unit in accordance with the current arm end position or the current arm end velocity of the multi-joint robot arm.

11 Claims, 22 Drawing Sheets

(56) References Cited

U.S. PATENT DOCUMENTS

| | | | |
|---|---|---|---|
| 2011/0178638 A1* | 7/2011 | Tsusaka et al. | 700/257 |
| 2011/0190932 A1* | 8/2011 | Tsusaka et al. | 700/254 |
| 2012/0010747 A1* | 1/2012 | Okazaki | 700/253 |

FOREIGN PATENT DOCUMENTS

| | | |
|---|---|---|
| JP | 2004-148466 | 5/2004 |
| JP | 2004-277039 | 10/2004 |
| JP | 2006-192564 | 7/2006 |
| WO | 2009/001550 | 12/2008 |
| WO | 2009/107358 | 9/2009 |

OTHER PUBLICATIONS

International Search Report issued Jun. 12, 2012 in International (PCT) Application No. PCT/JP2012/001824.

* cited by examiner

Fig. 11

| xy POSITION | INPEDANCE PARAMETER | | |
|---|---|---|---|
| | M[kg] | D[Ns/m] | K[N/m] |
| $x_1, y_1$ | 5 | 100 | 0 |
| $x_1, y_2$ | 5 | 80 | 0 |
| $x_1, y_3$ | 5 | 60 | 0 |
| $x_1, y_4$ | 5 | 35 | 0 |
| $x_1, y_5$ | 5 | 10 | 0 |
| $x_1, y_6$ | 5 | 55 | 0 |
| $x_1, y_7$ | 5 | 100 | 0 |
| $x_2, y_3$ | 5 | 100 | 0 |
| $x_3, y_3$ | 5 | 70 | 0 |
| $x_1, y_3$ | 5 | 60 | 0 |
| $x_4, y_3$ | 5 | 100 | 0 |

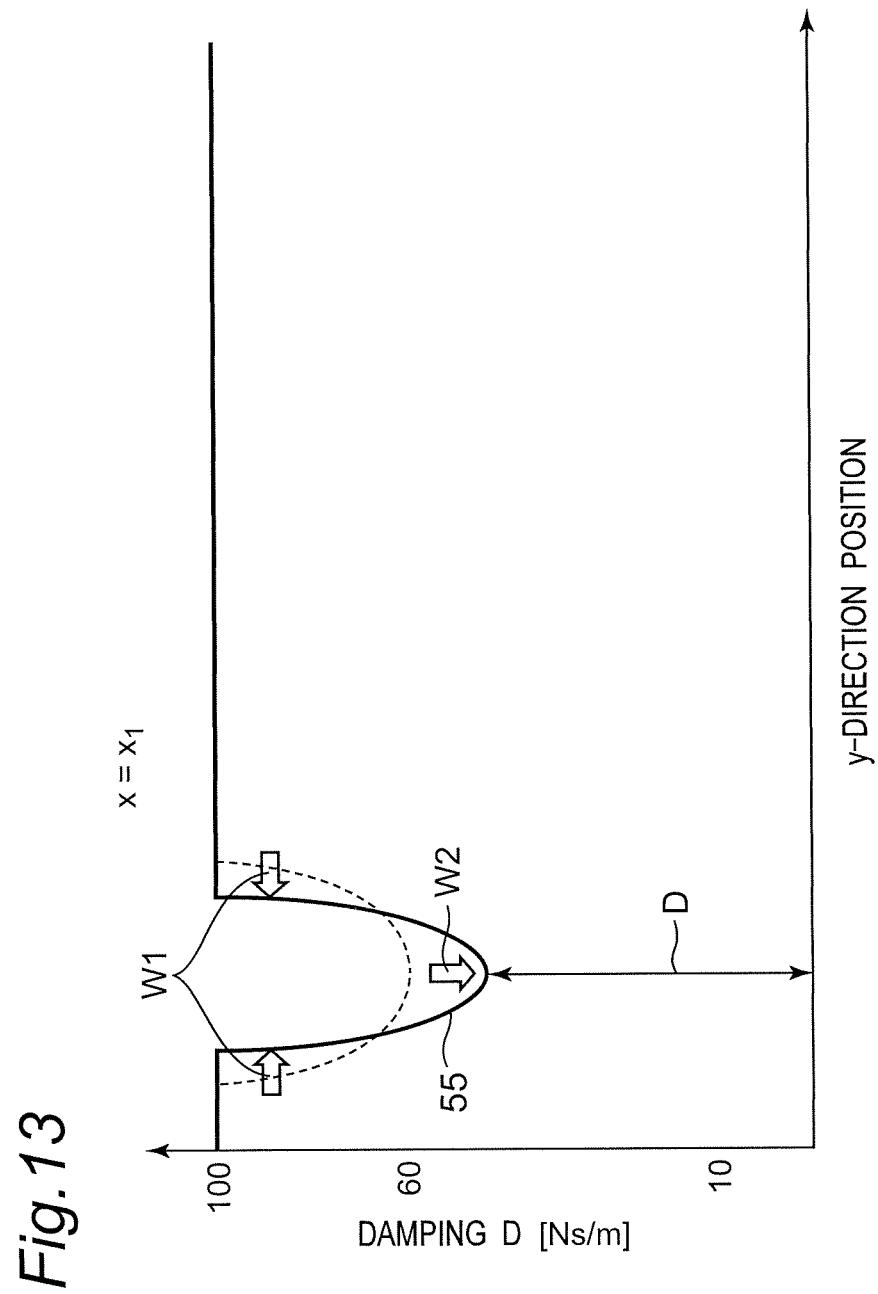

ROBOT, ROBOT CONTROL APPARATUS, ROBOT CONTROL METHOD, AND ROBOT CONTROL PROGRAM

CROSS-REFERENCE TO RELATED APPLICATIONS

This is a continuation application of International Application No. PCT/JP2012/001824, with an international filing date of Mar. 15, 2012, which claims priority of Japanese Patent Application No.: 2011-058629 filed on Mar. 17, 2011, the content of which is incorporated herein by reference.

DESCRIPTION OF THE RELATED ART

The technical field relates to a robot cooperating with a human, such as a robot provided with a robot arm to assist in works including power assist at factorys, homes, nursing care sites, and the like, a control apparatus of the robot, a controlling method of the robot, and a control program of the robot.

In recent years, human cooperative robots, which performs work assist such as power assist by operating in cooperation with humans in factories or the like, are drawing attention. Since such human cooperative robots operate as being manipulated by humans, practical works can be done without a high autonomous function. Further, since the robots operate under control of humans, the robots are highly safe. Hence, in the future, application not only to the works at factories but also to daily life assistance or nursing care at homes is expected.

The human cooperative robots are enabled to operate in accordance with the force applied thereto by humans chiefly through use of impedance control. The maneuverability is determined by the impedance parameters, i.e., inertia, damping, and stiffness. For example, in the case where low damping is set, though shifting is easily performed because the robots operate with a light force, the stability becomes poor. Thus, the low damping results in the characteristic not suitable for a precise operation such as positioning. On the other hand, in the case where high damping is set, though shifting is difficult because of great resistance, high stability is exhibited. Thus, the high damping provides the characteristic suitable for a precise operation such as positioning. Accordingly, ease of shifting and ease of positioning, for example, are incompatible with a single fixed impedance parameter.

Addressing such a problem, there is one conventional technique disclosing a work assist device that obtains appropriate maneuverability by changing the impedance parameters in accordance with work phases (Patent Literature 1).

Further, there is another conventional technique disclosing a power assist device that dynamically changes a prescribed vector field by determining an assist force based on a region section where an object is located, the position of the object, and a prescribed scalar field or a prescribed vector field (Patent Literature 2).

CITATION LIST

Patent Literatures

Patent Literature 1: Japanese Patent Publication No. 3504507
Patent Literature 2: Japanese Unexamined Patent Publication No. 2003-081599

SUMMARY

However, with the conventional technique disclosed in Patent Literature 1, it is necessary to discern the work phase. When the work phase cannot be discerned precisely, an appropriate impedance parameter may not be set. Further, when the work content is changed, the discerning rule must newly be found, and hence it is not easy to apply the technique to various works.

Further, while the conventional technique disclosed in Patent Literature 2 discloses dynamic change of the vector field, what Patent Literature 2 specifically discloses is merely that the converged state determining means determines whether or not positioning is made, and a minimum is provided to the potential. Accordingly, it is only effective in improving the maneuverability of the positioning operation. Further, with merely the provision of a minimum, it is difficult to realize a further improvement in maneuverability.

One non-limiting and exemplary embodiment provides a robot to which optimum impedance parameters can stably be set based on a simple algorithm and with which maneuverability of the works can be improved, a control apparatus of the robot, a control method of the robot, and a control program of the robot.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a robot, comprising:

a multi-joint robot arm;

an external force acquiring unit that is arranged at the multi-joint robot arm to acquire an external force;

an impedance map storage unit that stores, as an impedance map, a reference distribution of impedance parameters, the reference distribution of the impedance parameters associating positions of an arm end of the multi-joint robot arm shifting in accordance with an operation of the multi-joint robot arm with the impedance parameters including inertia, damping, and stiffness at each of the positions;

an impedance map variable unit that changes, in accordance with information of a current position of the arm end of the multi-joint robot arm, the distribution of the impedance parameters at one of a pre-position and a post-position relative to the position of the arm end performing an operation of the multi-joint robot arm with reference to the reference distribution of the impedance parameters in the impedance map; and an impedance control unit that exerts impedance control over the multi-joint robot arm based on the external force acquired by the external force acquiring unit and the distribution of the impedance parameters changed by the impedance map variable unit.

These general and specific aspects may be implemented using a system, a method, and a computer program, and any combination of systems, methods, and computer programs.

With the robot, the robot control apparatus, the robot control method, and the robot control program, since the impedance map variable unit is provided and updates the impedance map based on the current position of the arm end of the robot arm, optimum impedance parameters can stably be set based on a simple algorithm.

BRIEF DESCRIPTION OF THE DRAWINGS

These and other objects and features of the present disclosure will be apparent from the following description related to embodiments taken in conjunct ion with the accompanying drawings, in which:

FIG. 11 is a view describing specific numerical values of impedance parameters according to the first embodiment;

FIG. 13 is a view describing an updating method of the distribution of damping D by the impedance map variable means according to the combination of the first embodiment and the second embodiment;

DETAILED DESCRIPTION

Figure 1:
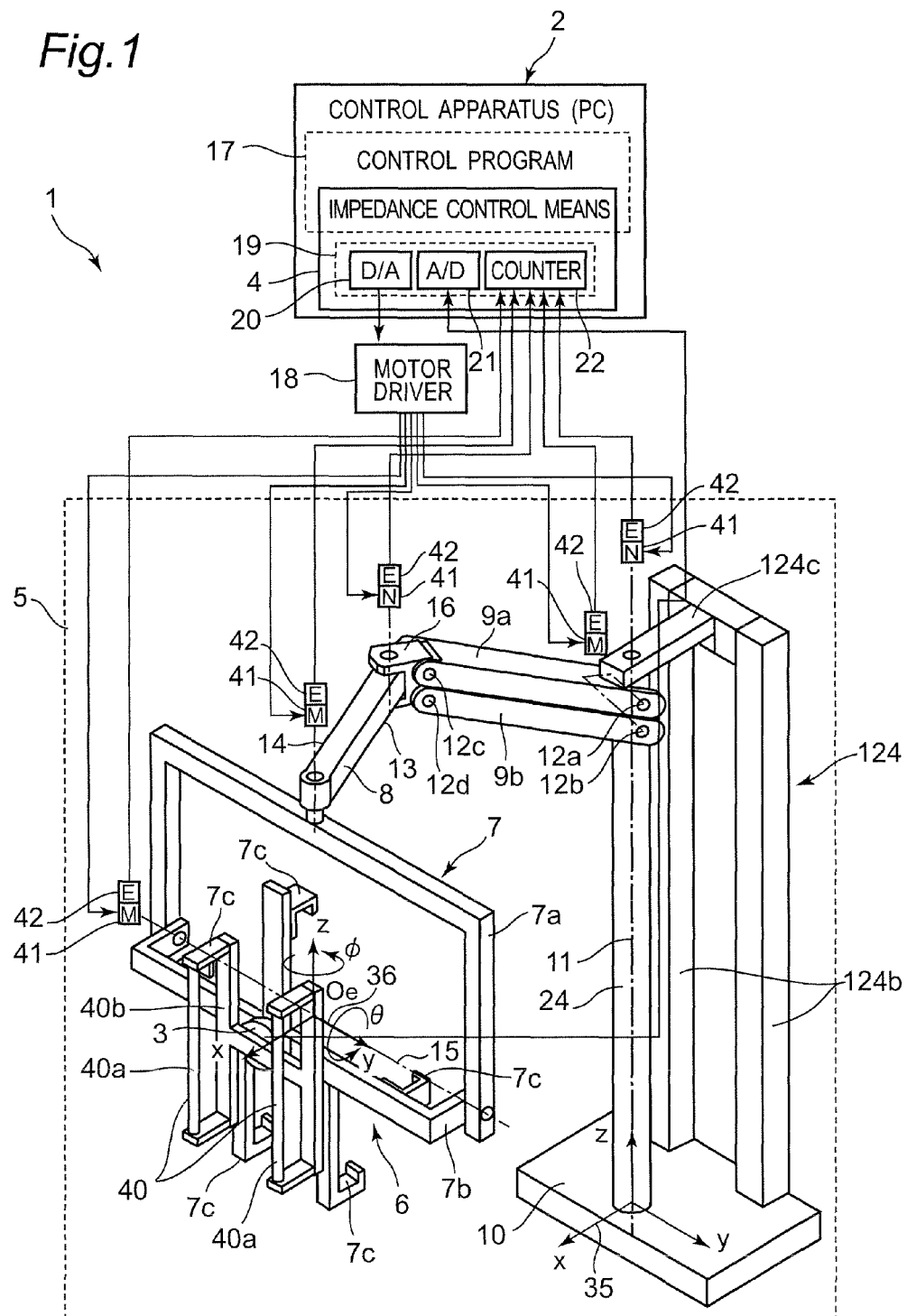
FIG. 1 is a view showing the overall structure of a robot according to a first embodiment.

In the following, with reference to the drawings, a detailed description will be given of embodiments of the present disclosure.

In the following, before proceeding to the detailed description of the embodiments of the present disclosure with reference to the drawings, various modes of the present disclosure will be described.

Examples of the disclosed technique are as follows.

1st aspect: A robot, comprising:

a multi-joint robot arm;

an external force acquiring unit that is arranged at the multi-joint robot arm to acquire an external force;

an impedance map storage unit that stores, as an impedance map, a reference distribution of impedance parameters, the reference distribution of the impedance parameters associating positions of an arm end of the multi-joint robot arm shifting in accordance with an operation of the multi-joint robot arm with the impedance parameters including inertia, damping, and stiffness at each of the positions;

an impedance map variable unit that changes, in accordance with information of a current position of the arm end of the multi-joint robot arm, the distribution of the impedance parameters at one of a pre-position and a post-position relative to the position of the arm end performing an operation of the multi-joint robot arm with reference to the reference distribution of the impedance parameters in the impedance map; and an impedance control unit that exerts impedance control over the multi-joint robot arm based on the external force acquired by the external force acquiring unit and the distribution of the impedance parameters changed by the impedance map variable unit.

2nd aspect: The robot according to the first aspect, further comprising a velocity calculation unit that obtains a velocity by differentiating information of the positions of the arm end of the multi-joint robot arm, wherein the impedance map variable unit changes, in accordance with the information of the current position of the arm end of the multi-joint robot arm and the velocity acquired by the velocity calculation unit, the distribution of the impedance parameters at one of a pre-position and a post-position relative to the position of the arm end where the arm end performs the operation of the multi-joint robot arm with reference to the reference distribution of the impedance parameters in the impedance map.

3rd aspect: The robot according to the first aspect, wherein the impedance map variable unit changes the damping of the impedance parameter at a position where the arm end of the multi-joint robot arm passes such that the damping becomes higher after the arm end of the multi-joint robot arm has passed the position than before.

4th aspect: The robot according to the third aspect, wherein the impedance map variable unit raises the damping at the position where the arm end of the multi-joint robot arm has passed after the arm end of the multi-joint robot arm has passed the position, and thereafter lowers the damping at the position than a raised damping value when the arm end of the multi-joint robot arm is away from the position by a certain distance.

5th aspect: The robot according to the first aspect, wherein the impedance map stored in the impedance map storage unit has a first region of a low damping for allowing the arm end of the multi-joint robot arm to be shifted, a second region of a higher damping than the damping of the first region for allowing the arm end of the multi-joint robot arm to be positioned, and a third region of a higher damping than the damping of the second region, the third region being arranged so as to surround the second region, and the impedance map variable unit changes an area of the second region surrounded by the third region, after the arm end of the multi-joint robot arm has entered the second region, to be smaller than an area before entrance of the arm end to the second region.

6th aspect: The robot according to the fifth aspect, wherein the impedance map variable unit changes a damping value of the second region, after the arm end of the multi-joint robot arm has entered the second region, toward a damping value lower than a damping value before the entrance of the arm end to the second region.

7th aspect: The robot according to the first aspect, wherein the impedance map stored in the impedance map storage unit has a first region of a low damping for allowing the arm end of the multi-joint robot arm to be shifted, and a second region of a higher damping than the damping of the first region for allowing the arm end to be positioned, wherein a fourth region of a higher damping than the damping of the first region and being equal to or smaller than the damping of the second region is set, the fourth region being for allowing the arm end to be positioned between the second region and the first region, and the impedance map variable unit changes the damping of the fourth region, after the arm end has entered the fourth region, to be higher than the damping of the second region.

8th aspect: The robot according to the seventh aspect, further comprising a velocity calculation unit that obtains a velocity by differentiating information of the positions of the arm end of the multi-joint robot arm, wherein the impedance map variable unit sets a height of the damping of the fourth region, in accordance with the information of the current position of the arm end of the multi-joint robot arm, and a velocity at which the arm end of the multi-joint robot arm enters the fourth region, the velocity being the velocity acquired by the velocity calculation unit.

9th aspect: A robot control apparatus, comprising:

an impedance map storage unit that stores, as an impedance map, a reference distribution of impedance parameters, the reference distribution of the impedance parameters associating positions of an arm end of a multi-joint robot arm shifting in accordance with an operation of the multi-joint robot arm with the impedance parameters including inertia, damping, and stiffness at each of the positions;

an impedance map variable unit that changes, in accordance with information of a current position of the arm end of the multi-joint robot arm, a distribution of the impedance parameters at one of a pre-position and a post-position relative to the position of the arm end performing an operation of the multi-joint robot arm with reference to the reference distribution of the impedance parameters in the impedance map; and an impedance control unit that exerts impedance control over the multi-joint robot arm based on an external force acquired by an external force acquiring unit arranged at the multi-joint robot arm and the distribution of impedance parameters changed by the impedance map variable unit.

10th aspect: The robot control method, comprising:

acquiring an external force by an external force acquiring unit arranged at a multi-joint robot arm;

storing in an impedance map storage unit, as an impedance map, a reference distribution of impedance parameters, the reference distribution of the impedance parameters associating positions of an arm end of the multi-joint robot arm shifting in accordance with an operation of the multi-joint robot arm with the impedance parameters including inertia, damping, and stiffness at each of the positions;

changing, by an impedance map variable unit and in accordance with information of a current position of the arm end of the multi-joint robot arm, a distribution of the impedance parameters at one of a pre-position and a post-position relative to the position performing an operation of the multi-joint robot arm with reference to the reference distribution of the impedance parameters in the impedance map; and exerting impedance control, by an impedance control unit, over the multi-joint robot arm based on the external force acquired by the external force acquiring unit and the distribution of the impedance parameters changed by the impedance map variable unit.

11th aspect: A computer-readable recording medium including a robot control program for causing a computer to function as:

an impedance map storage unit that stores, as an impedance map, a reference distribution of impedance parameters, the reference distribution of the impedance parameters associating positions of an arm end of a multi-joint robot arm shifting in accordance with an operation of the multi-joint robot arm with the impedance parameters including inertia, damping, and stiffness at each of the positions;

an impedance map variable unit that changes, in accordance with information of a current position of the arm end of the multi-joint robot arm, a distribution of the impedance parameters at one of a pre-position and a post-position relative to the position of the arm end performing an operation of the multi-joint robot arm with reference to the reference distribution of the impedance parameters in the impedance map; and an impedance control unit that exerts impedance control over the multi-joint robot arm based on an external force acquired by an external force acquiring unit arranged at the multi-joint robot arm and the distribution of the impedance parameters changed by the impedance map variable unit.

In the following, with reference to the drawings, a detailed description will be given of the embodiments of the present disclosure.

First Embodiment

FIG. 1 shows the structure of a robot 1 according to a first embodiment of the present disclosure. The robot 1 includes a multi-joint robot arm 5, and a control apparatus 2 that controls the operation of the multi-joint robot arm 5.

The control apparatus 2 is structured by an ordinary personal computer in hardware. Further, the control apparatus 2 except for an input/output IF 19 of an impedance control means (an impedance control unit) 4 is realized in software as a control program 17 executed by the personal computer.

The input/output IF 19 is structured by a D/A board 20, an A/D board 21, and a counter board 22 each connected to an extension slot such as a PCI bus of the personal computer.

Execution of the control program 17 for controlling the operation of the multi-joint robot arm 5 of the robot 1 enables the control apparatus 2 to function.

Joint angle information which is output from an encoder 42 serving as one example of a joint angle sensor of each of joints 11, 12 (12a, 12b), 13, 14, and 15 of the robot arm 5 is acquired by the control apparatus 2 through the counter board 22. The control apparatus 2 calculates control command values for the rotary operations performed by the joints 11, 12, 13, 14, and 15, based on the acquired joint angle information. The calculated control command values are provided to a motor driver 18 through the D/A board 20, and motors 41 of respective joints 11, 12, 13, 14, and 15 of the robot arm 5 are driven according to the control command values sent from the motor driver 18.

The robot arm 5 is a multi-link manipulator with five degrees of freedom, and structured to include a hand (which serves as one example of the arm end of the multi-joint robot arm 5) 6 for gripping an object, a front arm link 8, an elbow block 16, a pair of upper arm links 9a and 9b, a first joint pillar 24, and a pedestal part 10.

The front arm link 8 has its wrist part 7 rotatably connected about a joint axis of the fourth joint 14. A hand 6 is attached to the tip of the wrist part 7.

To one end of an elbow block 16, a proximal end of the front arm link 8 is rotatably coupled about the joint axis of the third joint 13.

Paired upper arm links 9a and 9b are structured in a parallel link structure, in which their one ends are connected to the other end of the elbow block 16 so as to be rotatable about the joint axes of the two joints 12c and 12d of the second joint.

The first joint pillar 24 is supported by the pedestal part 10 and a support member 124 so as to position along the top-bottom direction and to be rotatable about the joint axis of the first joint 11. To the part near the upper end of the first joint pillar 24, the other ends of the upper arm links 9a and 9b are connected so as to be rotatable about the joint axes of the two joints 12a and 12b of the second joint. Specifically, the lower end of the first joint pillar 24 is supported at the pedestal part 10 so as to be rotatable about the joint axis of the first joint 11, and the upper end of the first joint pillar 24 is supported at an upper end support part 124c of the support member 124 projecting from the upper end of the support part 124b of the support member 124 provided upright at the pedestal part 10, so as to be rotatable about the joint axis of the first joint 11.

The elbow block 16 rotates about the second joint 12a and the second joint 12b such that the joint axis of the third joint 13 constantly maintains to be in parallel to the joint axis of the first joint 11 by the rotation about the joint axes of the second joints 12a, 12b, 12c, and 12d.

In this manner, the robot arm 5 structures the multi-link manipulator of five degrees of freedom, in which rotation about a total of five axes is enabled.

The wrist part 7 is made up of a combination of a square bracket-shaped (]) first bracket part 7a and a second bracket part 7b, which is structured by an inverted T-shaped upper part and a pair of L-shaped lower parts, to thereby structure the hand 6. That is, the upper end central part of the first bracket part 7a is coupled to the tip of the front arm link 8 so as to be rotatable about the joint axis of the fourth joint 14. On the inner sides of the opposing ends of the first bracket part 7a, the opposing ends of the inverted T-shaped upper part of the second bracket part 7b are coupled so as to be capable of rotating about the joint axis of the fifth joint 15. As will be described later, to the central part of the inverted T-shaped upper part of the second bracket part 7b, an operational handle 40 is attached. The first bracket part 7a and the second bracket part 7b are provided with engaging parts 7c that can engage with an object such as a panel of a flat type television set, at a total of five places, i.e., the upper end and the parts near the opposing ends of the inverted T-shaped upper part, and the lower ends of paired L-shaped lower parts. As a result, for example, the upper end edge and opposing side edges of a rectangular plate-like object such as the panel of a flat type television set are held by the engaging part 7c at the upper end of the inverted T-shaped upper part and the engaging parts 7c at the parts near the opposing ends of the first bracket part 7a, and the lower end edge of the rectangular plate-like object such as the panel of a flat type television set is held by the engaging parts 7c at the lower ends of the paired L-shaped lower parts of the second bracket part 7b. Thus, the rectangular plate-like object such as a panel of the flat type television set can stably be gripped by the hand 6. Hence, the hand 6 has two rotary shafts that are perpendicular to each other, i.e., the fourth joint 14 arranged along the top-bottom direction and the fifth joint 15 arranged along the lateral direction being perpendicular to the top-bottom direction. Accordingly, the hand 6 can change the relative orientation (orientation) of the hand 6 to the pedestal part 10 to thereby change the relative orientation (orientation) of the object gripped by the hand 6.

The joints 11, 12a, 13, 14, and 15 structuring the rotary parts of respective shafts are each provided with a rotary driver device (a motor 41 in the first embodiment) provided at one member of each of the joints 11, 12a, 13, 14, and 15, and an encoder 42 detecting a rotary phase angle (i.e., a joint angle) of the rotary shaft of the motor 41. Then, with the rotary shaft of the motor 41 being coupled with the other member, by positively and negatively rotating the rotary shaft, the other member is allowed to rotate about the joint axis relative to the one member. The rotary driver device is controlled by the motor driver 18, which will be described later. In the first embodiment, the motor 41 and the encoder 42 serving as one example of the rotary driver device are arranged in each of the joints 11, 12a, 13, 14, and 15 of the robot arm 5.

The reference character 35 in FIG. 1 denotes an absolute coordinate system in which relative positional relationship with reference to the pedestal part 10 is fixed, and the reference character 36 denotes an arm end coordinate system in which relative positional relationship with reference to the hand 6 is fixed. It is defined as follows: the origin position $O_e$ (x, y, z) of the arm end coordinate system 36 as seen from the absolute coordinate system 35 is the arm end position of the robot arm 5; ($\phi$, $\theta$) being the representation in the roll angle and the pitch angle of the orientation of the arm end coordinate system 36 as seen from the absolute coordinate system 35 is the arm end orientation of the hand 6 of the robot arm 5; and the arm end position and orientation vector of the hand 6 is $r=[x, y, z, \phi, \theta]^T$. When the arm end position and orientation of the hand 6 of the robot arm 5 is to be controlled, the arm end position and orientation vector r is caused to follow the desired arm end position and orientation vector $r_d$.

Figure 2:
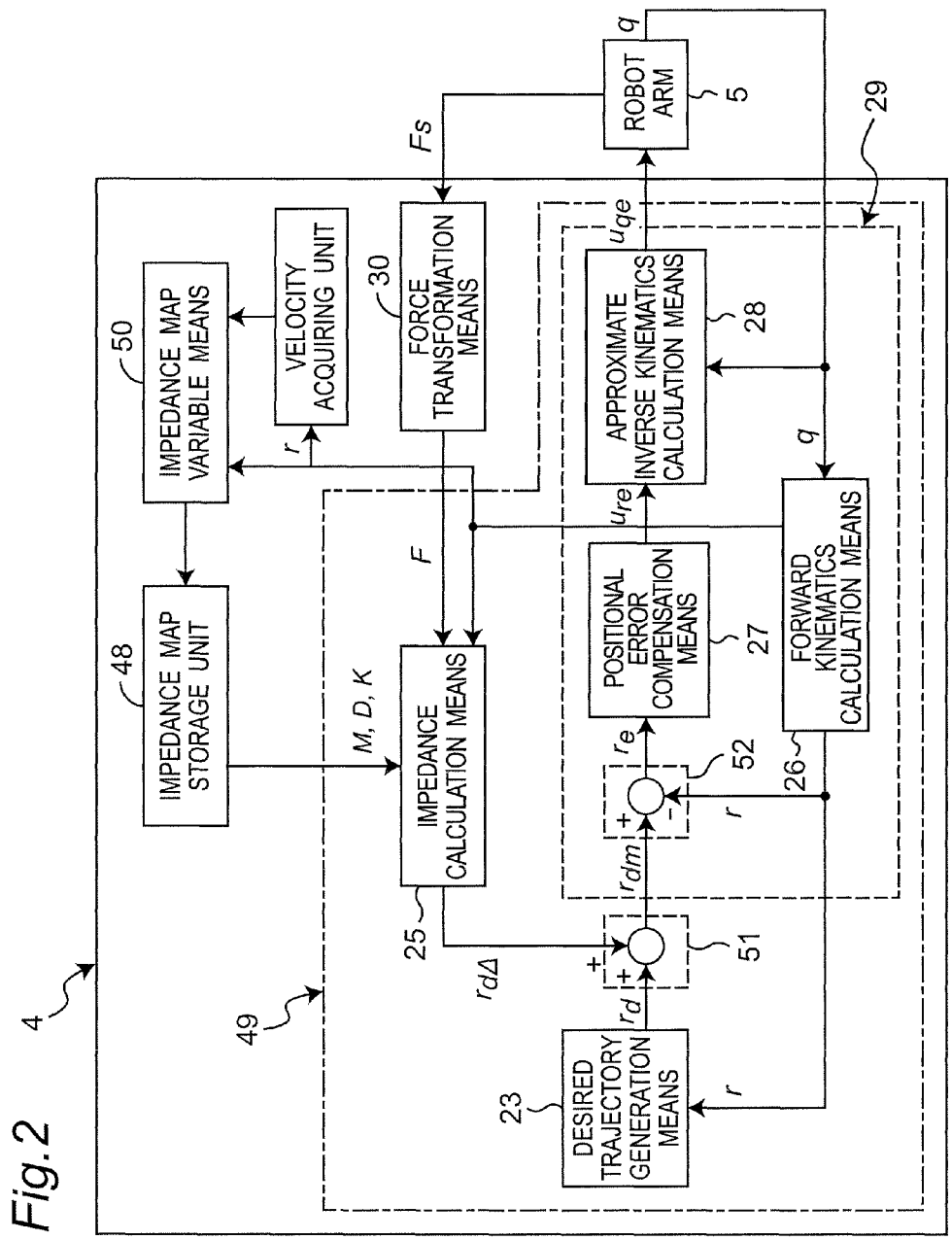
FIG. 2 is a block diagram showing the structure of an impedance control means of the robot according to the first embodiment.

The operational handle 40 is connected to the hand 6 via a force sensor 3 serving as one example of an external force acquiring means (an external force acquiring unit or an external force acquiring device). The operational handle 40 is structured with a pair of bar-like grip parts 40a extending along the top-bottom direction. The pair of bar-like grip parts 40a is fixed to an H-shaped support body 40b, at the central part of which is fixed to the force sensor 3. Thus, the user 39 can directly grip the pair of grip parts 40a of the operational handle 40 and apply force, to thereby manipulate the robot 5. The force sensor 3 is arranged between the operational handle 40 and the robot arm 5, so that the manipulation force of the user 39 can be detected by the force sensor 3. Next, with reference to FIG. 2, a description will be given of the detail of the impedance control means 4. In FIG. 2, the reference character 5 denotes the robot arm shown in FIG. 1. From the robot arm 5, a current value (a joint angle vector) $q=[q_1, q_2, q_3, q_4, q_5]^T$ of the joint angle measured by the encoder 42 of the joint axis of each joint is output, to be acquired by the impedance control means 4 through the counter board 22. Here, $q_1, q_2, q_3, q_4$, and $q_5$ are the joint angles of the first joint 11, the second joint 12a, the third joint 13, the fourth joint 14, and the fifth joint 15.

Further, from the force sensor 3 of the robot arm 5, an external force (a measured value) $F_s=[f_x, f_y, f_z, n_x, n_y, n_z]^T$ measured by the force sensor 3 is output, and acquired by the impedance control means 4 through the A/D board 21. Here, $f_x, f_y$, and $f_z$ are the force components of respective three directions perpendicular to one another (x-axis, y-axis, and z-axis directions) in the arm end coordinate system 36. Further, $n_x, n_y$, and $n_z$ are rotation moments about respective three directions perpendicular to one another in the arm end coordinate system 36.

Desired trajectory generation means (a desired trajectory generation unit) 23 outputs an arm end position and orientation desired vector $r_d$ for realizing the desired operation of the robot arm 5. As to the targeted operation of the robot arm 5, the positions ($r_{d0}, r_{d1}, r_{d2}, \ldots$) at respective points for time ($t=0, t=t_1, t=t_2, \ldots$) are previously given as time-series data in accordance with the targeted work. The desired trajectory generation means 23 interpolates the trajectories between the respective points using polynomial interpolation, and generates an arm end position and orientation desired vector $r_d$.

An impedance map storage unit 48 stores and retains the reference distribution (the distribution serving as the reference before any changed or update is made, or the distribution in the initial state) of the impedance parameters M, D, and K (inertia M, damping D, and stiffness K) at three-dimensional positions in the work region of the robot arm 5 as the database of the impedance map.

Impedance map variable means (an impedance map variable unit) 50 changes the reference distribution of the impedance parameters in the impedance map storage unit 48 according to the current position of the arm end (hand) 6 of the robot arm 5 received from a forward kinematics calculation means 26.

impedance calculation means (an impedance calculation unit) 25 is the unit that provides the robot arm 5 with the function of realizing control over the values of the mechanical impedance of the robot arm 5 such that the values become mechanical impedance set values. The impedance calculation means 25 outputs 0 when the robot arm 5 solely operates under positional control so as to follow the desired trajectory generated by the desired trajectory generation means 23. On the other hand, when the robot arm 5 and the human cooperatively work, the impedance calculation means 25 calculates and outputs an arm end position and orientation desired correction output $\Delta r_d$ for the robot arm 5 to realize the mechanical impedance in accordance with the following Formula (1) using the impedance parameters M, D, and K (inertia M, damping D, and stiffness K) set at the impedance map storage unit 48 and the external force $F=[f_x, f_y, f_z, n_\phi, n_\theta]^T$ being input to force transformation means (a force transformation unit) 30, whose description will follow. The arm end position and orientation desired correction output $\Delta r_d$ is added at the first arithmetic unit 51 to the arm end position and orientation desired vector $r_d$ output from the desired trajectory generation means 23, whereby an arm end position and orientation correction desired vector $r_{dm}$ is generated. Here, $n_\phi$ and $n_\theta$ are the rotation moments about the roll axis and the yaw axis, respectively.

$$\Delta r_d = (s^2 M + sD + K)^{-1} F \quad (1)$$

where $$M = \begin{bmatrix} M & 0 & 0 & 0 & 0 \\ 0 & M & 0 & 0 & 0 \\ 0 & 0 & M & 0 & 0 \\ 0 & 0 & 0 & M & 0 \\ 0 & 0 & 0 & 0 & M \end{bmatrix} \quad (2)$$

$$D = \begin{bmatrix} D & 0 & 0 & 0 & 0 \\ 0 & D & 0 & 0 & 0 \\ 0 & 0 & D & 0 & 0 \\ 0 & 0 & 0 & D & 0 \\ 0 & 0 & 0 & 0 & D \end{bmatrix} \quad (3)$$

$$K = \begin{bmatrix} K & 0 & 0 & 0 & 0 \\ 0 & K & 0 & 0 & 0 \\ 0 & 0 & K & 0 & 0 \\ 0 & 0 & 0 & K & 0 \\ 0 & 0 & 0 & 0 & K \end{bmatrix}, \quad (4)$$

and s is a Laplace operator.

The forward kinematics calculation means (forward kinematics calculation unit) 26 receives, through the counter board 22, the joint angle vector q being the current value q of the joint angle being output from the encoder 42 of each joint axis of the robot arm 5. The forward kinematics calculation means 26 geometrically calculates the conversion from the joint angle vector q of the robot arm 5 to the arm end position and orientation vector r.

A second arithmetic unit 52 obtains an error $r_e$ between the arm end position and orientation vector r calculated by the forward kinematics calculation means 26 and the arm end position and orientation correction desired vector $r_{dm}$ generated by the first arithmetic unit 51, and the obtained error $r_e$ is output to the positional error compensation means (a positional error compensation unit) 27.

The positional error compensation means 27 obtains positional error compensation output $u_{rp}$ based on the error $r_e$ obtained by the second arithmetic unit 52, and outputs the obtained positional error compensation output $u_{rp}$ to approximate inverse kinematics calculation means (an approximate inverse kinematics calculation unit) 28.

The approximate inverse kinematics calculation means 28 performs approximate calculation of inverse kinematics using the following approximate expression:

$$u_{out} = J_r(q)^- u_{in}$$

where $J_r(q)$ is the Jacobian matrix satisfying the following relationship:

$$\dot{r} = J_r(q)\dot{q}$$

$u_{in}$ is an input to the approximate inverse kinematics calculation means 28, and $u_{out}$ is an output from the approximate inverse kinematics calculation means 28. Here, it can be approximated to $$q_e \approx \dot{q}, r_e \approx \dot{r}$$

Therefore, substituting them into the definition of Jacobian matrix:

$$\dot{r} = J_r(q)\dot{q}$$

the following is established.

$$q_e \approx J_r(q)^{-1} r_e$$

That is, by multiplying $J_r(q)^{-1}$ by the approximate inverse kinematics calculation means 28, the error value as to the arm end position and orientation can be converted to the error value as to the joint angle. Accordingly, when a positional error compensation output $u_{re}$, which is the value obtained by the arm end position and orientation error $r_e$ multiplied by gain or the like, is input to the approximate inverse kinematics calculation means 28, as the output of the approximate inverse kinematics calculation means 28, the approximate inverse kinematics calculation means 28 outputs a joint angle error compensation output $u_{qe}$ for compensating a joint angle error $q_e$.

The joint angle error compensation output $u_{qe}$ is provided as a voltage command value from the approximate inverse kinematics calculation means 28 to the motor driver 18 through the D/A board 20. The motor driver 18 drives each motor 41 to rotate each joint axis positively and negatively, whereby the robot arm 5 operates.

A description will be given of the basic principle of the operation as to the basic structure of the impedance control means 4 structured as described above.

The basic operation is the feedback control (positional control) of the arm end position and orientation error $r_e$ performed by the positional error compensation means 27. The area enclosed by a broken line in FIG. 2 is a position control system 29. Use of a PID compensator as one example of the positional error compensation means 27 realizes control under which the arm end position and orientation error $r_e$ converges to 0. Thus, the desired impedance control operation of the robot arm 5 can be realized.

When the impedance control is to be exerted, to the position control system 29 described above, the arm end position and orientation desired correction output $\Delta_{rd}$ is added by the impedance calculation means 25 at the first arithmetic unit 51 to the arm end position and orientation desired vector $r_d$ output from the desired trajectory generation means 23, and desired value correction of the arm end position and orientation is performed. Accordingly, with the position control system 29 described above, the arm end position and orientation desired value slightly deviates from the original value, and consequently the mechanical impedance is realized. The area described above enclosed by the alternate long and short dash line in FIG. 2 is the structure referred to as a positional control-based impedance control system 49, and the impedance control system 49 realizes the mechanical impedance of inertia M, damping D, and stiffness K. The impedance control means 4 functions as one example of a control means (a control unit) (or operation control means or an operation control unit).

Figure 3:
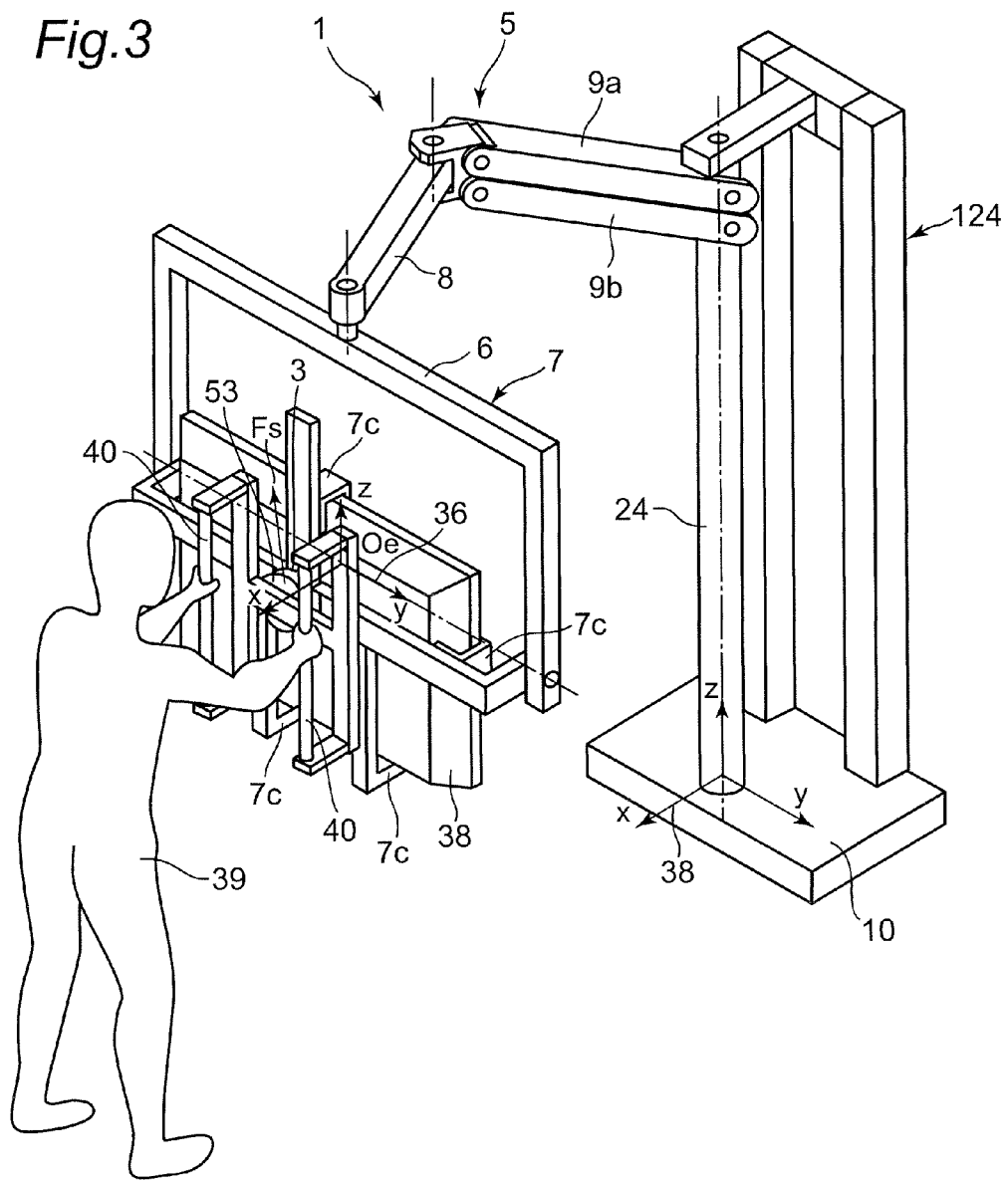
FIG. 3 is a view describing a cooperative conveyance work carried out by a human and the robot according to the first embodiment.

Use of the impedance control described above realizes cooperative work, such as the cooperative conveyance of an object 38 by the user 39 and the robot 1 as shown in FIG. 3. When the user 39 applies force with both hands to the pair of bar-like grip parts 40a of the operational handle 40 in an attempt to shift the object 38, the force is transferred to the robot arm 5 of the robot 1 through the operational handle 40. The force transferred to the robot arm 5 is detected as an external force $F_s$ by the force sensor 3 of the robot arm 5. As to the external force $F_s$ to be an input to the impedance control means 4, in order to take into consideration of the gravitation of the operational handle 40 and the difference between the origin $O_e$ of the arm end coordinate system 36 and the position of the measurement plane 53 of the force sensor 3, a force transformation means 30 performs calculation in accordance with Formula (5) based on the external force $F_s$ detected by the force sensor 3, and an external force F derived from this calculation is used.

$$F = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \end{pmatrix} \quad (5)$$

$$\left( \begin{pmatrix} {}^0R_e & 0 \\ 0 & {}^0R_e \end{pmatrix} \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & l_{se} & 0 & 1 & 0 \\ 0 & l_{se} & 0 & 0 & 0 & 1 \end{pmatrix} F_s - mg \begin{pmatrix} 0 \\ 0 \\ 1 \\ 0 \\ l_{sh}\cos\theta \\ 0 \end{pmatrix} \right)$$

where m is the mass of the operational handles 40, g is the acceleration of gravity, ${}^0R_e$ is a rotation matrix that converts the orientation from the arm end coordinate system 36 to the absolute coordinate system 35, $l_{se}$ is the distance from the origin $O_e$ of the arm end coordinate system 36 to the measurement plane 53 of the force sensor 3, and $l_{sh}$ is the distance from the barycenter of the operational handle 40 to the measurement plane 53 of the force sensor 3. When the impedance control is exerted employing the external force F derived from Formula (5) as an input, the cooperative conveyance is realized because the robot arm 5 operates along the direction of the force applied by the user 39. It is to be noted that, the mass m of the operational handle 40, and the acceleration of gravity g are previously stored in the force transformation means 30.

Figure 4:
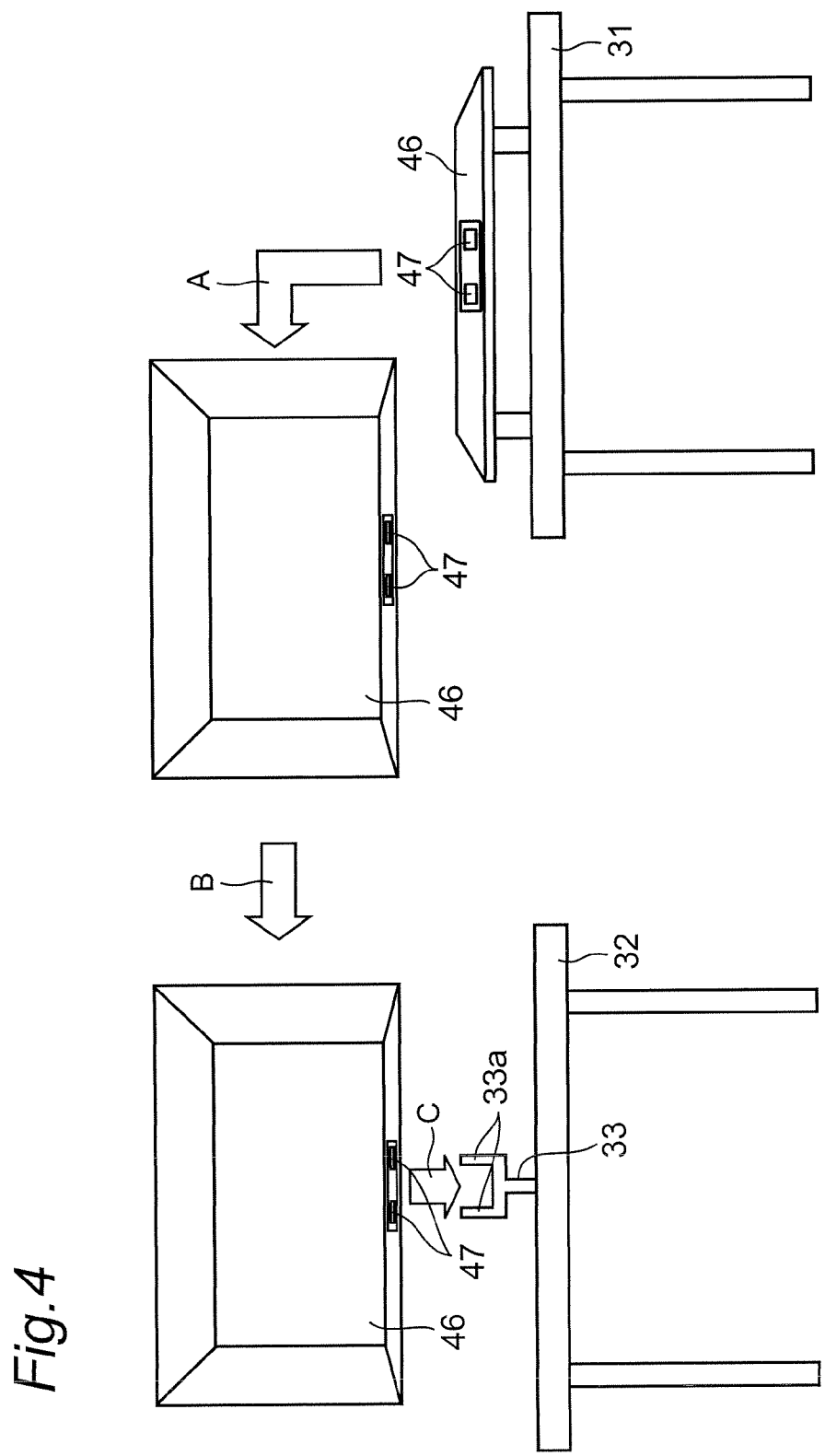
FIG. 4 is a view describing a detailed procedure of the cooperative conveyance work according to the first embodiment.

The control apparatus 2 of the robot 1 according to the first embodiment of the present disclosure is characterized by, in addition to the basic structure of the impedance control means 4 described above, provision of the impedance map storage unit 48 and the impedance map variable means 50. In the following, the characteristic is detailed taking up an exemplary case in which the work shown in FIG. 4 is performed. In the following, a flat type television set 46 is used as an example of the object 38.

The work content shown in FIG. 4 is as follows.

First, the flat type television set 46 which is placed face-down on a first workbench 31 on the right side in FIG. 4 is gripped, lifted, and rotated by 90° (see arrow A) in θ-direction about y-axis by the hand 6, so that the flat type television set 46 stands upright in the top-bottom direction.

Thereafter, the flat type television set 46 is horizontally shifted by the hand 6 from the position above the first workbench 31 to the position above the second workbench 32 (see arrow B), and the flat type television set 46 gripped by the hand 6 is aligned with a stand 33 arranged on the second workbench 32.

Thereafter, the flat type television set 46 gripped by the hand 6 is lowered, and a pair of projections 33a of the stand 33 at the second workbench 32 is inserted into a pair of insertion holes 47 provided at the bottom face of the flat type television set 46 (see arrow C). The foregoing is the work noted above.

Figure 5:
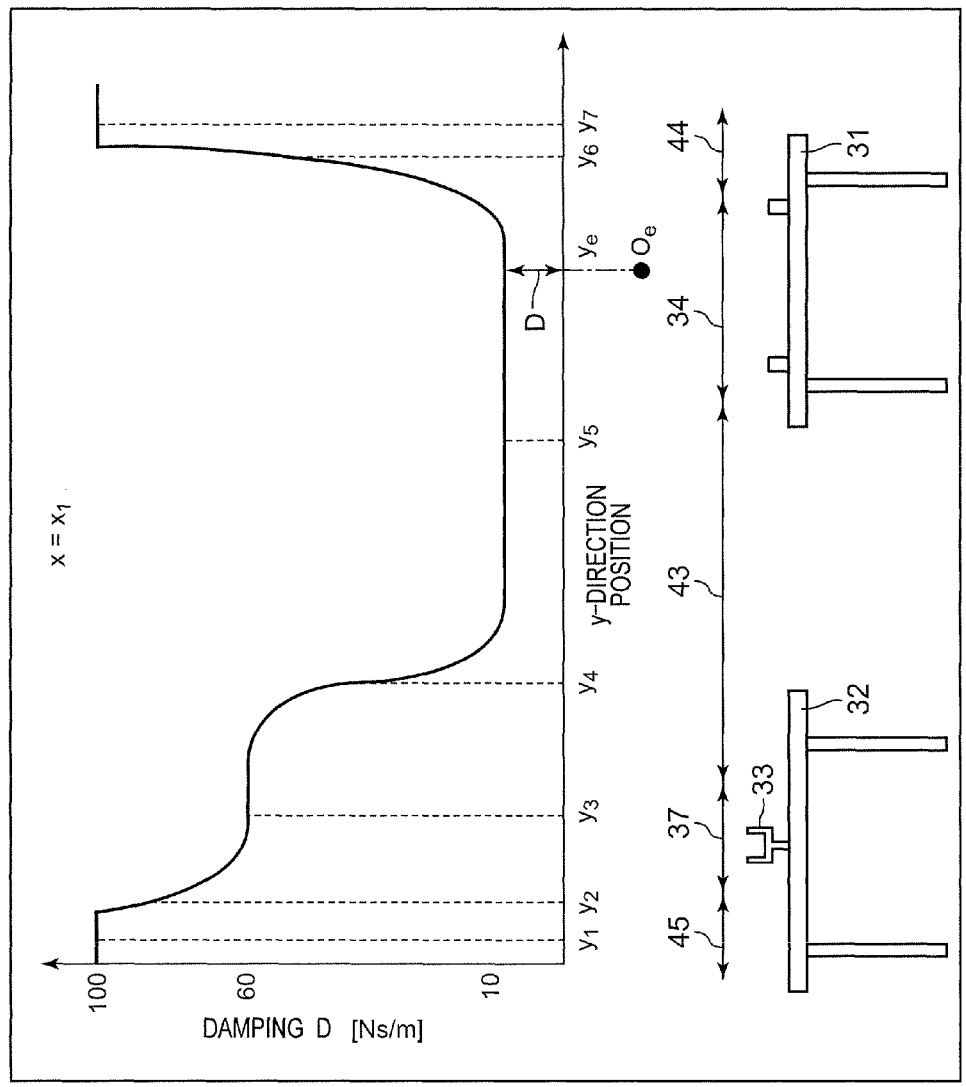
FIG. 5 is a view describing an impedance map according to the first embodiment.

In order to improve the maneuverability during the work shown in FIG. 4, in the initial state before the work is started, the impedance map storage unit 48 sets the distribution of damping D as the reference distribution shown in FIG. 5 and FIGS. 12A to 12G, for example. As to the parameters other than damping D, for example, inertia M is set to a certain value of 5 kg and stiffness k is set to a certain value of 0 N/m as the reference distribution in the impedance map storage unit 48. FIG. 5 shows the distribution of damping D in y-direction in the work region of the hand 6 where $x=x_1$. FIGS. 12A to 12G show the distribution of damping D in x-direction where $y=y_1$ to $y_7$, respectively. As shown in FIG. 5 and FIGS. 12A to 12G, the distribution of damping D is the two-dimensional distribution as to x-direction and y-direction. It is to be noted that, as to z-direction, the damping D determined by x-direction and y-direction is constantly continues as it is. When the arm end position $O_e$ (the origin of the arm end coordinate system 36) of the robot arm 5 is at the illustrated position $y_e$ (see FIG. 5), the value of damping D assumes the value indicated by arrow D. FIG. 11 exemplarily shows the values of impedance parameters at the positions $(x_1, y_1)$ to $(x_1, y_7)$ shown in FIG. 5 and the positions $(x_1, y_3)$ to $(x_4, y_3)$ shown in FIG. 12C.

In a work region 34 of the first workbench 31, damping D is set to a low value (e.g., 10 Ns/m). The damping D rises at the position short of the second workbench 32, in a shifting region 43 of the hand 6. The damping D is set to a high value (e.g., 60 Ns/m) in a work region 37 of the second workbench 32. Further, the damping D in outer regions 44 and 45, which are the outer region of the work regions 34 and 37, is set to a further higher value (e.g., up to 100 Ns/m). Here, while the difference between the damping D in the outer regions 44 and 45 and the damping D of the work region 37 is shown to be (100 Ns/m)/(60 Ns/m)=approx. 1.7 times as one example, it is merely an example and will vary depending on the performance of the robot arm and that of the control system. It is to be noted that, from the viewpoint of the range in which the user feels appropriate as the operational feeling, the value of 1.7 times may be employed.

In the region of low damping D, the user 39 can easily shift the robot arm 5 with a light force. On the other hand, in the region of high damping D, though an increase in resistance makes it difficult for the user 39 to shift the robot arm 5, the maneuverability can be so improved that the stability of the robot arm 5 is improved and positioning work can precisely be performed.

Therefore, in accordance with the initial distribution (reference distribution) of damping D shown in FIG. 5, shifting with a light force from the first workbench 31 to the second workbench 32 is realized. As the robot arm 5 approaches the second workbench 32, the damping D rises and hence the resistance increases. This assists in deceleration of the robot arm 5. Further, when the robot arm 5 reaches the position above the second workbench 32, positioning manipulation can easily be performed thanks to high damping D, whereby insertion work into the stand 33 can easily be performed. Still further, the resistance to the shifting becomes further greater in the outer regions 44 and 45 thanks to further higher damping D. Hence, in the outer region 44, inadvertent operation of the user 39 reversely shifting the robot arm 5 from the first workbench 31 to the second workbench 32 can be avoided. In the outer region 45, the robot arm 5 can be prevented from passing over the position of the stand 33.

That is, in the region where shifting with a light force is desired, low damping D is set. In the region where stabilized operation of the robot arm 5 and precise positioning work are desired, damping D may be set to be higher than that in the region where shifting with a light force is desired. Further, in the region where no shifting of the hand 6 of the robot arm 5 is desired, damping D that is several times higher than the high damping D may be set.

In addition to the basic maneuverability described above, by the impedance map variable means 50 varying the distribution of damping D in the impedance map storage unit 48, a further improvement in maneuverability can be achieved.

Figure 6A:
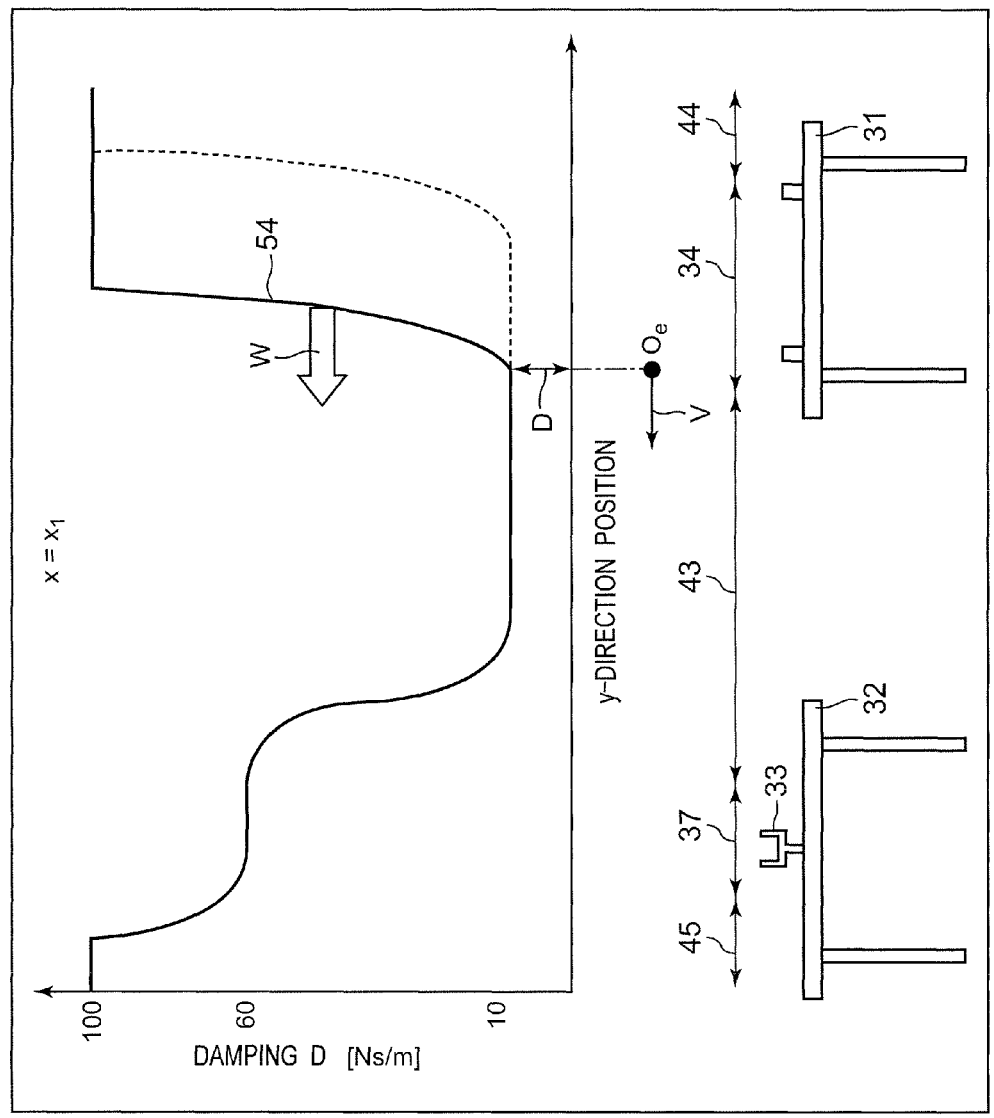
FIG. 6A is a view describing an updating method of the distribution of damping D by an impedance map variable means according to the first embodiment.

The impedance map variable means 50 receives the current arm end position and orientation vector r of the robot arm 5 from the forward kinematics calculation means 26. As shown in FIG. 6A, as the arm end position of the robot arm 5 represented by $O_e$ (the origin of the arm end coordinate system 36) shifts as indicated by arrow V, the impedance map variable means 50 changes a damping wall 54 that leads to the region of high damping D, so as to follow the arm end position of the robot arm 5 as indicated by arrow W, based on the input current arm end position and orientation vector r (i.e., the impedance map variable means 50 shifts the damping wall 54 in the left direction as indicated by arrow W from the position of dashed line). Thus, at the positions where the arm end of the robot arm 5 has passed by shifting, the damping D becomes high as the damping wall 54 passes. Therefore, the arm end of the robot arm 5 is not easily moved in the reverse direction to arrow V. This prevents the erroneous manipulation of the user 39. Here, the region of high damping D, that is, for example, damping for providing the effect of difficulty in shifting in the reverse direction as the wall 54, may be 100 Ns/m. With the damping of this numerical value, the user 39 feels heavy when the user 39 actually attempts to shift the robot arm 5 and the user has the operational feeling of difficulty in shifting. To the contrary, in the region of low damping D, in the case where the damping is 10 Ns/m, the user can easily shift the robot arm 5 just by the fingertips and the user 39 has the operational feeling of ease in shifting.

Figure 6B:
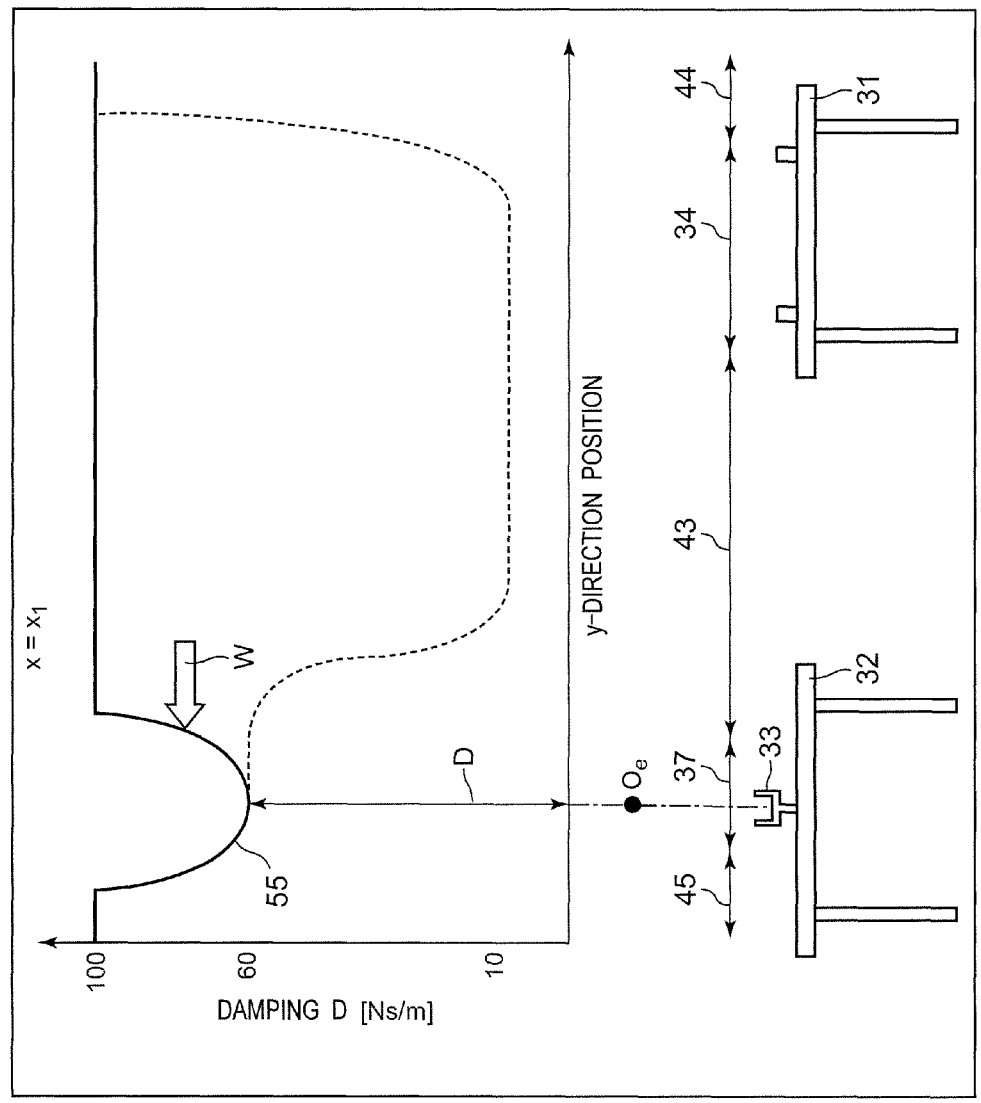
FIG. 6B is a view describing the updating method of the distribution of damping D by the impedance map variable means according to the first embodiment.

Further, when the hand 6 of the robot arm 5 reaches above the second workbench 32 and the flat type television set 46 gripped by the hand 6 of the robot arm 5 is to be positioned relative to the stand 33 based on the input current arm end position and orientation vector r, as shown in FIG. 6B, the impedance map variable means 50 changes damping D such that a valley 55 of damping D is formed about the center of the stand 33. Thus, the valley 55 of damping D makes it difficult for the arm end position of the robot arm 5 to greatly shift in the advancing or receding direction relative to the center of the stand 33. Thus, the arm end position of the robot arm 5 is constrained near the stand 33, whereby the positioning operation of the hand 6 of the arm end is facilitated. Here, exemplary damping as the valley 55 for providing the effect of constraining the arm end position may be approximately 60 Ns/m. With the damping of this numerical value, though it is difficult to shift the robot arm 5 just by fingertips because of great resistance, the robot arm 5 can be shifted if the user tightly holds the robot arm and manipulate it.

Figure 7:
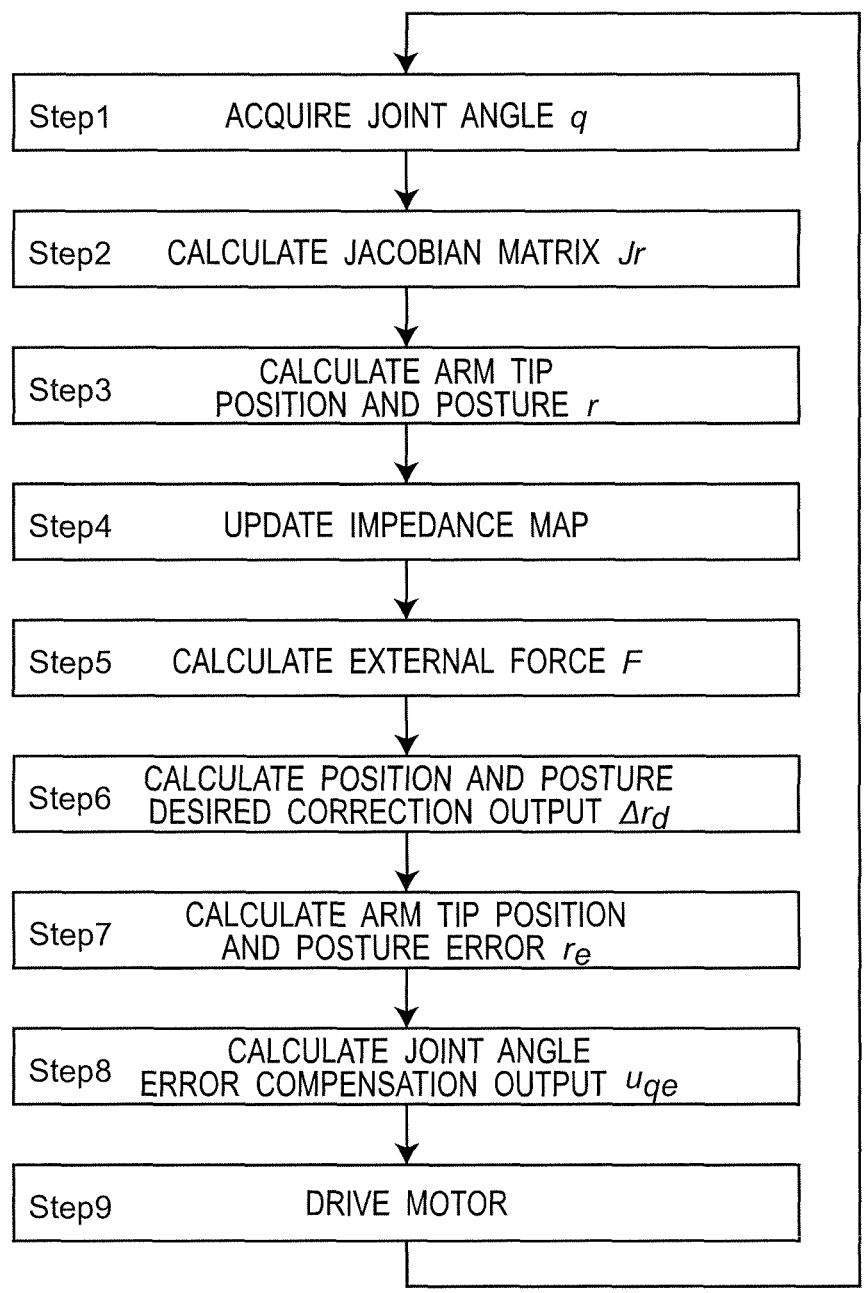
FIG. 7 is a flowchart representing overall operational steps of the impedance control means of the robot according to the first embodiment.

FIG. 7 is a flowchart of describing operational steps in the impedance control mode performed by the control program based on the principle described above.

In Step S1, the joint angle data (joint angle vector q) measured by each encoder 42 is acquired by the control apparatus 2.

In Step S2, the approximate inverse kinematics calculation means 28 calculates Jacobian matrix $J_r$ and the like required for calculating the kinematics of the robot arm 5.

In Step S3, the forward kinematics calculation means 26 calculates the current arm end position and orientation vector r of the robot arm 5 based on the joint angle data (joint angle vector q) received from the robot arm 5 (the process at the forward kinematics calculation means 26).

In Step S4, the current arm end position and orientation vector r is acquired by the impedance map variable means 50 from the forward kinematics calculation means 26, and the distribution of damping D in the impedance map storage unit 48 is updated.

In Step S5, the external force $F_s$ being the value measured by the force sensor 3 is acquired by the force transformation means 30, and the force transformation means 30 calculates the external force F based on the external force $F_s$ and Formula (5). As a result, the external force $F_s$ being the value measured by the force sensor 3 is transformed into the external force F by the force transformation means 30.

In Step S6, the impedance calculation means 25 calculates the arm end position and orientation desired correction output $\Delta r_d$ using impedance parameters M, D, and K received from the impedance map storage unit 48, the joint angle data (joint angle vector q) received from each encoder 42, and the external force F transformed by the force transformation means 30 (the processing at the impedance calculation means 25).

In Step S7, the first arithmetic unit 51 calculates the sum of the arm end position and orientation desired vector $r_d$ received from the desired trajectory generation means 23 and the arm end position and orientation desired correction output $\Delta r_d$ of the impedance calculation means 25. The second arithmetic unit 52 calculates the error $r_e$ of the arm end position and orientation being the difference between the arm end position and orientation correction desired vector $r_{dm}$ calculated and obtained by the first arithmetic unit 51 and the current arm end position and orientation vector r received from the forward kinematics calculation means 26. The error $r_e$ of the arm end position and orientation calculated and obtained by the second arithmetic unit 52 is input to the positional error compensation means 27, and the positional error compensation means 27 obtains positional error compensation output $u_{re}$ (the processing at the positional error compensation means 27). Specific example of the positional error compensation means 27 may be a PID compensator. Appropriate adjustment of the three gains of proportional, differential, integral structuring the diagonal matrix of constants allows the control to be exerted so that the positional error converges to 0.

In Step S8, the approximate inverse kinematics calculation means 28 multiplies the inverse matrix of the Jacobian matrix $J_r$ calculated in Step S2. Thus, the approximate inverse kinematics calculation means 28 converts the positional error compensation output $u_{re}$ received from the positional error compensation means 27 from the value as to the error of the arm end position and orientation to the joint angle error compensation output $u_{qe}$, which is the value as to the error of the joint angle (the processing at the approximate inverse kinematics calculation means 28).

In Step S9, the joint angle error compensation output $u_{qe}$ is provided from the approximate inverse kinematics calculation means 28 to the motor driver 18 through the D/A board 20. By the motor driver 18 changing the amount of the electric current flowing through each motor 41, the rotary motion of the joint axis of each joint of the robot arm 5 occurs.

Repetitive execution of the above Steps S1 to S9 as the control calculation loop realizes control exerted over the operation of the robot arm 5. It is to be noted that, the sequence of operations of Steps S2 to S5 may be executed in parallel, and it may not necessarily be in this order.

As described above, in the first embodiment, there is provided the impedance map variable means 50 that changes the distribution of the impedance parameters at the position on the pre-side or post-side of the position of the arm end performing the operation of the robot arm 5 with reference to the reference distribution of the impedance parameters in the impedance map according to the information of the current position of the arm end (hand) 6 of the robot arm 5. Hence, by the impedance map variable means 50 changing the distribution of impedance parameters M, D, and K in the impedance map storage unit 48 in accordance with the position of the hand 6 of the robot arm 5, that is, the current arm end position, the damping wall 54 leading to the region of high damping D can be changed so as to follow the arm end position of the robot arm 5. Thus, the positions where the arm end of the robot arm 5 has passed over as the arm end of the robot arm 5 shifts exhibit higher damping D. Therefore, reversion is not likely to occur. Thus, the safe robot which exhibits the effect of avoiding erroneous manipulation of the user 39 and incorrect work procedures can be implemented.

Further, when the flat type television set 46 gripped by the hand 6 is positioned relative to the stand 33, the impedance map variable means 50 forms the damping valley 55 near the stand 33 in accordance with the current arm end position. Thus, what is exhibited is the effect that the arm end position of the robot arm 5 is constrained near the stand 33, which realizes further easier the positioning operation than in the case where damping D is simply high.

As described above, not only the effect as to the positioning operation but also the effect of avoiding reversion shifting can be exhibited. Also, it is advantageous in that a plurality of effects as to maneuverability can simultaneously be realized.

Figure 8:
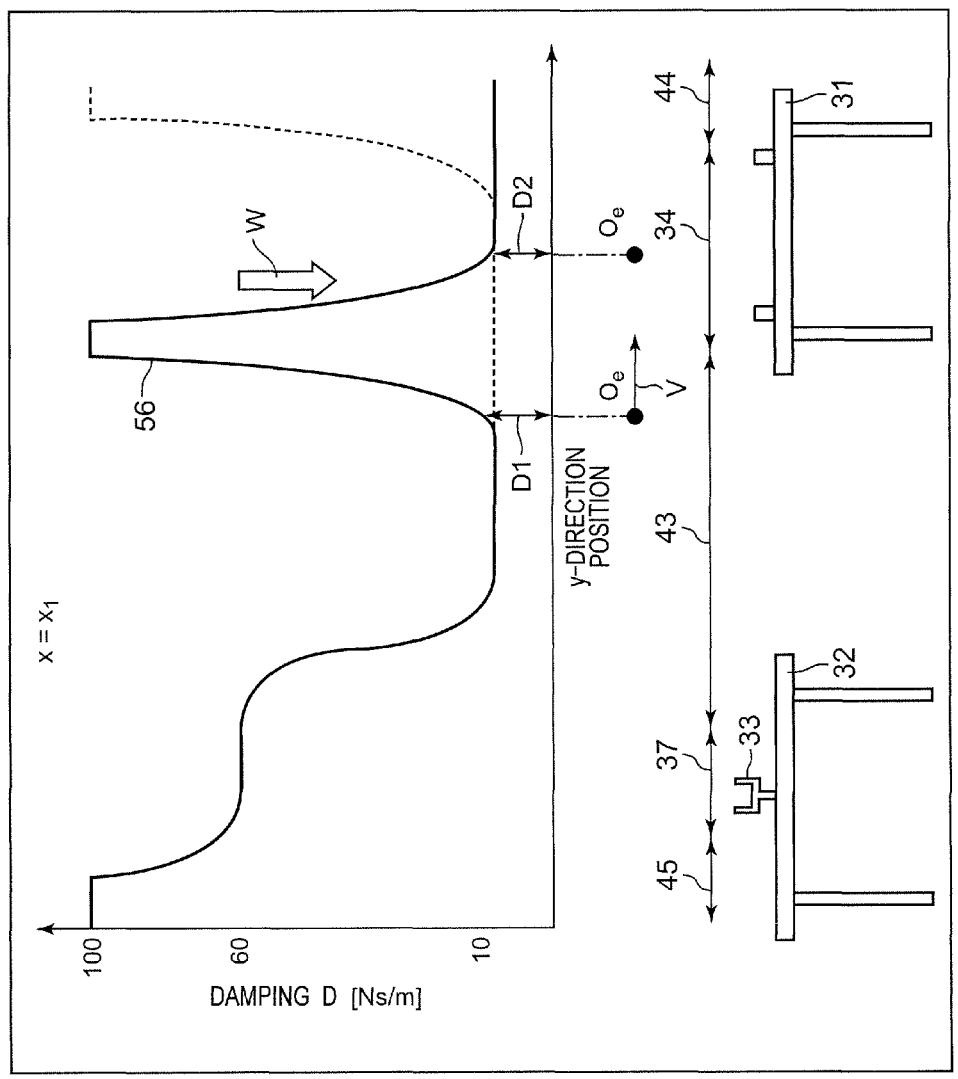
FIG. 8 is a view describing another updating method of the distribution of damping D by the impedance map variable means according to the first embodiment.

It is to be noted that, in the first embodiment, as shown in FIG. 6A, the impedance map variable means 50 raises damping D at the positions where the arm end of the robot arm 5 has passed over as the arm end of the robot arm 5 shifts. On the other hand, as a variation of the first embodiment, as shown by a mountain 56 of damping D in FIG. 8, another possible updating method is possible in which the impedance map variable means 50 raises the damping D and thereafter again lowers the damping D. In the case where the impedance map variable means 50 again lowers damping D, the impedance map variable means 50 may return the value to the damping D before being raised, or the impedance map variable means 50 may lower the value to a value lower to some extent than the increased damping D. In this case, by the mountain 56 of damping D, the user feels resistance to the reversion operation indicated by arrow V. Accordingly, this similarly exhibits the effect of avoiding erroneous manipulation. In addition thereto, when the reversion operation is intentionally continued against the resistance, the mountain 56 of damping D is overcome and the region of low damping D as indicated by arrow D2 is reached. Therefore, again the operation can be performed by a light force, and the reversion operation also becomes easier. Thus, according to the method shown in FIG. 8, the operational sequence can be flexible, e.g., reversion is possible when the reversion operation is intentionally performed so that the work can be performed again, and hence flexibility in work can be increased. It is to be noted that, though the manipulation can be performed with a lighter force as the damping is lower, excessively light setting makes the control unsteady, and will invite vibration. Accordingly, an exemplary practical lower limit value may be 10 Ns/m.

Second Embodiment

The basic structure of a robot 1 according to the second embodiment of the present disclosure is identical to that according to the first embodiment shown in FIGS. 1 and 2. Therefore, the description of the common parts will not be repeated, and the difference will solely be detailed below.

Figure 9A:
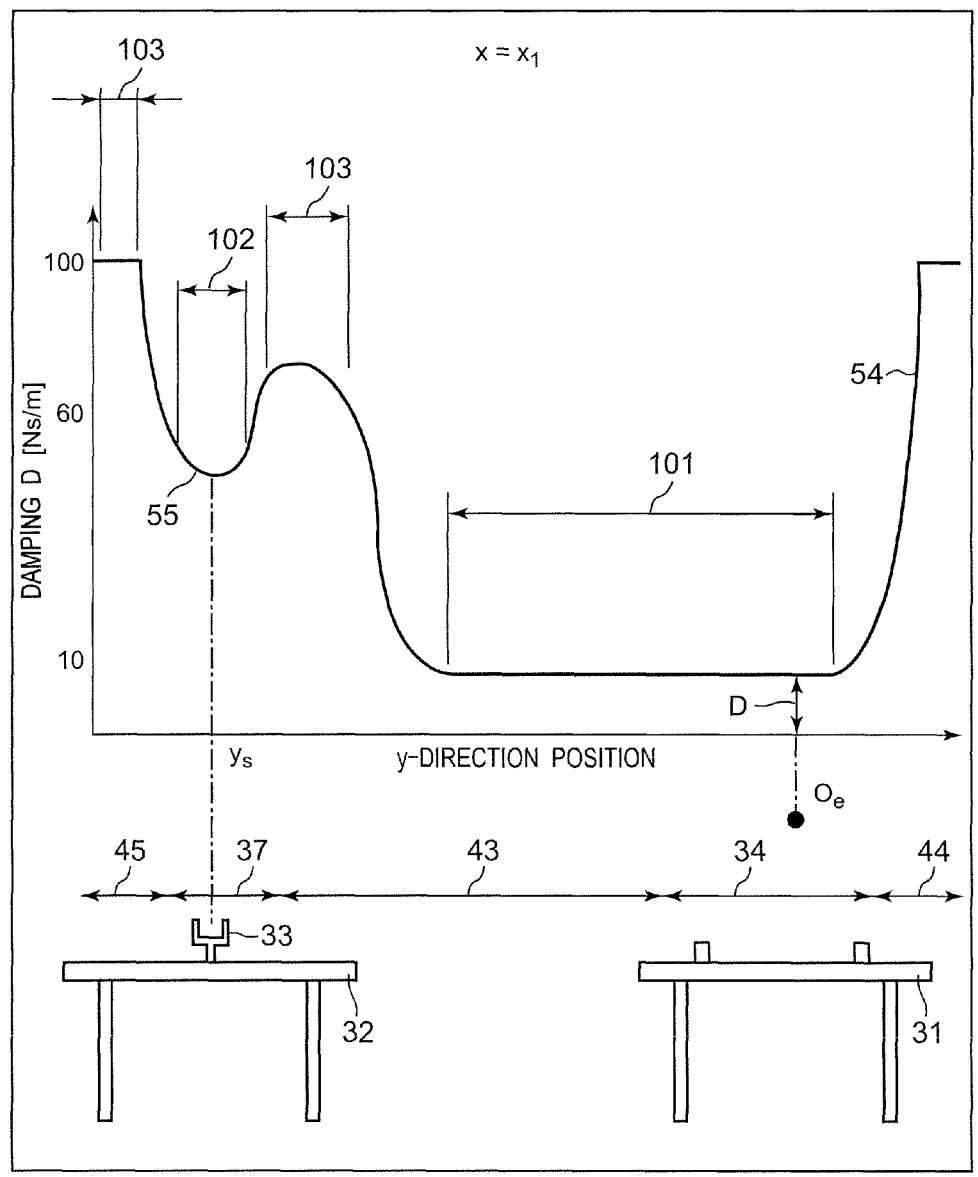
FIG. 9A is a view describing an impedance map according to a second embodiment.
Figure 9B:
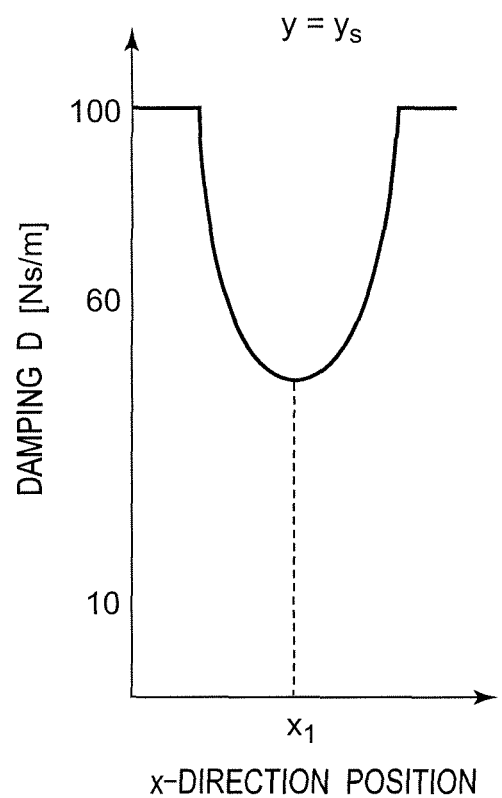
FIG. 9B is a view describing the impedance map according to the second embodiment.

In the second embodiment, as shown in FIGS. 9A and 9B, the initial state of the impedance map storage unit 48, that is, the impedance map of the reference distribution (the distribution serving as the reference before any changed or update is made, or the distribution in the initial state) of the impedance parameters M, D, and K (inertia M, damping D, and stiffness K) stored in the impedance map storage unit 48 is structured by: a first region 101 of low damping for allowing the arm end of the robot arm 5 to shift; a second region 102 of damping higher than that of the first region 101 for allowing the arm end of the robot arm 5 to be positioned; and a third region 103 of damping higher than that of the first region 101 and the second region for allowing the arm end of the robot arm 5 to be further positioned so as to surround the second region 102 of high damping. The valley 55 of damping D is set near the stand 33 of the second workbench 32. That is, the first region 101 is set because the first region 101 is the start position of the work; the third region 103 is set around the second workbench 32, and the valley 55 of damping D about the center of the stand 33 of the second workbench 32 is set by the second region 102. Hence, as seen from the position in the y-direction, the crest of the mountain of the third region 103 is set to position near the boundary between the shifting region 43 and the second workbench region 37, and the second region 102 is set at the second workbench region 37. Further, the third region 103 is also set at the outer region 45. Strictly, in FIG. 9A, a transition region is present between the first region 101 and the third region 103, and another transition region is present between the third region 103 and the second region 102. The reason why the transition regions are arranged in this manner is to prevent the following situation. When the impedance parameters are set to change stepwise, the control abruptly changes when the boundary is crossed. This may provide a shock to the user, or under a poor condition, the control system becomes unstable and vibration may occur. On the other hand, in the case where no transition regions are provided, and the third region 103 is adjacent to the first region 101 and the second region 102 is adjacent to the third region 103, the values may be set to gradually vary so as to smoothly continue at the peripheral part of each region, in order to prevent the foregoing problems.

Figure 9C:
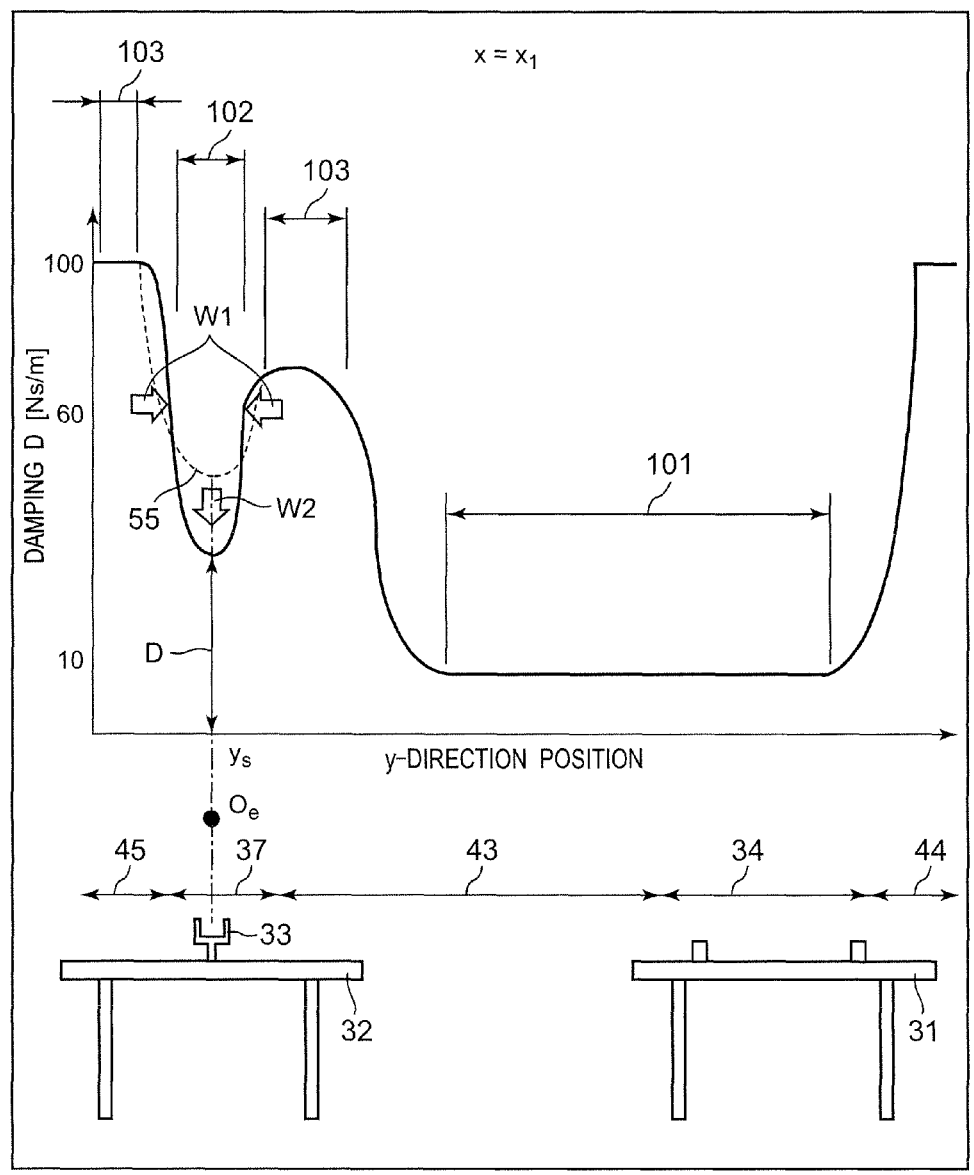
FIG. 9C is a view describing the impedance map according to the second embodiment.
Figure 9D:
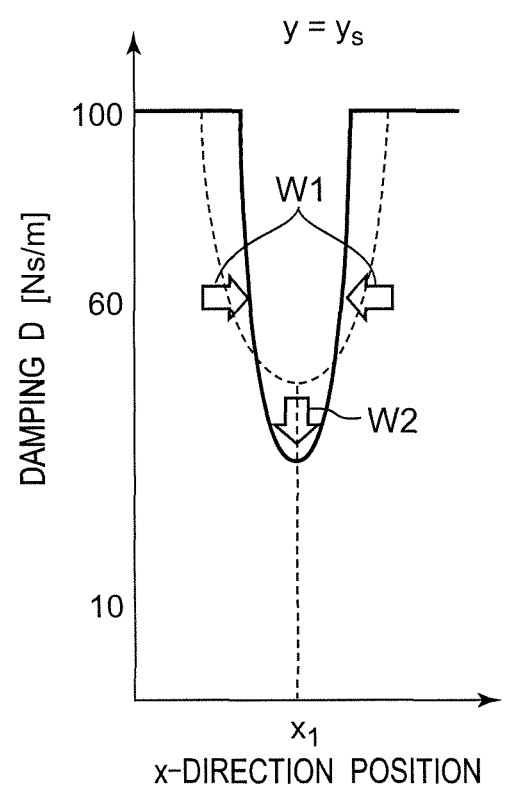
FIG. 9D is a view describing the impedance map according to the second embodiment.

When the work as to the flat type television set 46 similarly to that in the first embodiment is started, and the arm end of the robot arm 5 shifts and the hand 6 gripping the flat type television set 46 reaches the position near the stand 33, i.e., the position of the valley 55 of damping D of the second region 102, as shown in FIGS. 9C and 9D, the impedance map variable means 50 gradually updates the parameters in the impedance map storage unit 48 in the direction narrowing the width of the valley 55 of damping D (in other words, in the direction reducing the area of the second region 102 being the valley 55 of damping D as seen two-dimensionally) (see arrow W1), and in the direction increasing the depth of the valley 55 of damping D (see arrow W2). The rate of updating in the direction narrowing the width of the valley 55 of damping D, and the rate of increasing the depth of the valley 55 of damping D can previously be set by the impedance map variable means 50.

According to the updating method of the impedance map storage unit 48 performed by the impedance map variable means 50 described above, by the impedance map variable means 50 narrowing the width and increasing the depth of the valley 55 of damping D, the effect of the arm end position of the robot arm 5 being constrained and guided to the bottom of the valley of damping D is enhanced, whereby positioning of the robot arm 5 to the stand 33 can more easily and precisely be performed.

Third Embodiment

The basic structure of a robot 1 according to a third embodiment of the present disclosure is identical to that according to the first embodiment shown in FIGS. 1 and 2. Therefore, the description of the common parts will not be repeated, and the difference will solely be detailed below.

Figure 10A:
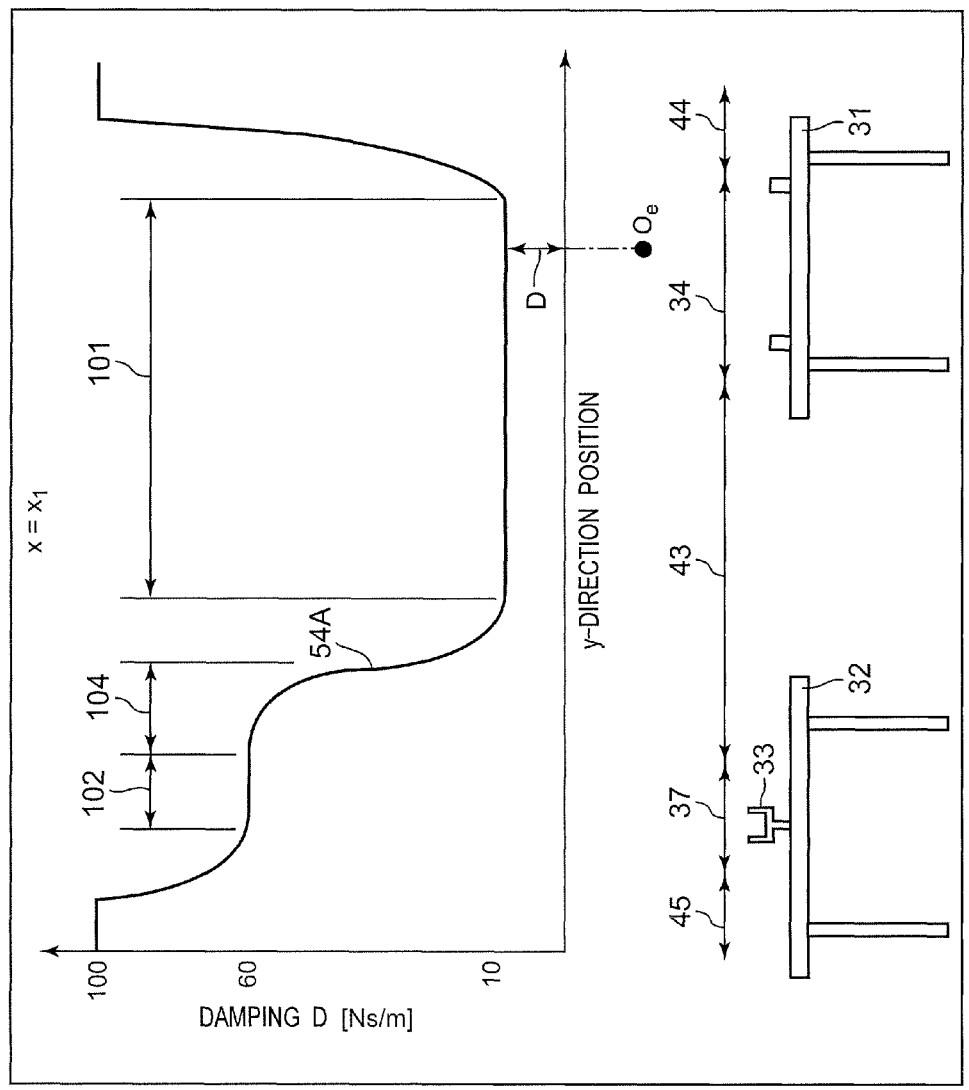
FIG. 10A is a view describing an impedance map according to a third embodiment.
Figure 10B:
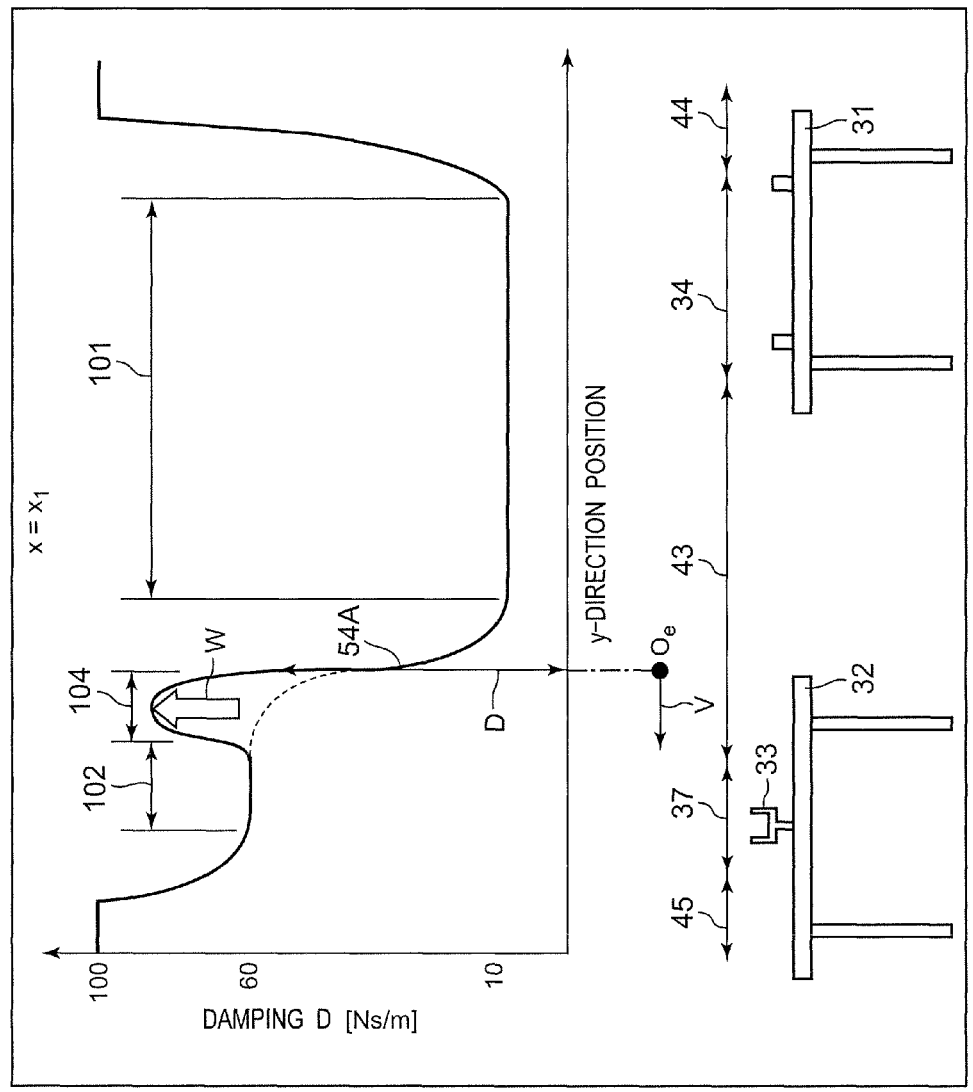
FIG. 10B is a view describing the impedance map according to the third embodiment.
Figure 12A:
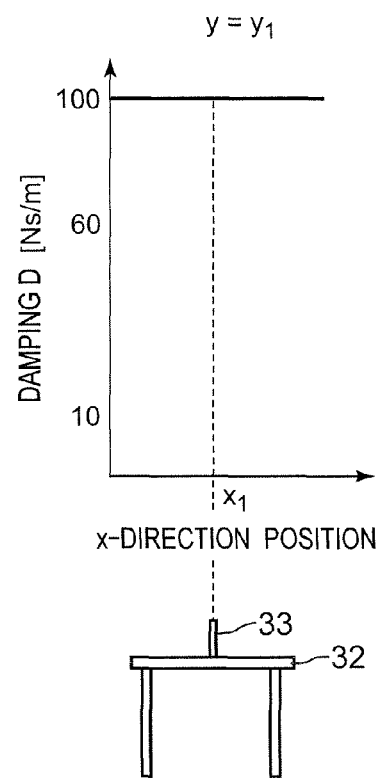
FIG. 12A is a view describing the distribution of damping D in x-direction where $y=y_1$, in a work region of a hand of the robot according to the first embodiment.
Figure 12B:
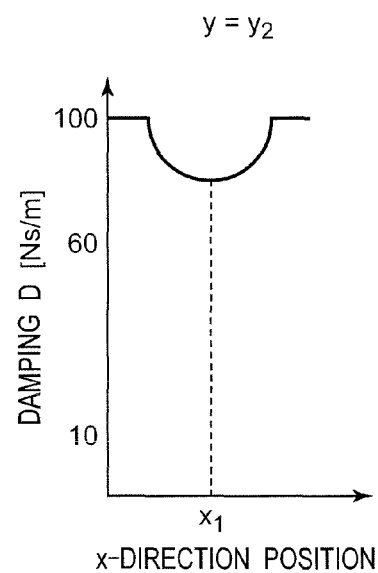
FIG. 12B is a view describing the distribution of damping D in x-direction where $y=y_2$, in a work region of the hand of the robot according to the first embodiment.
Figure 12C:
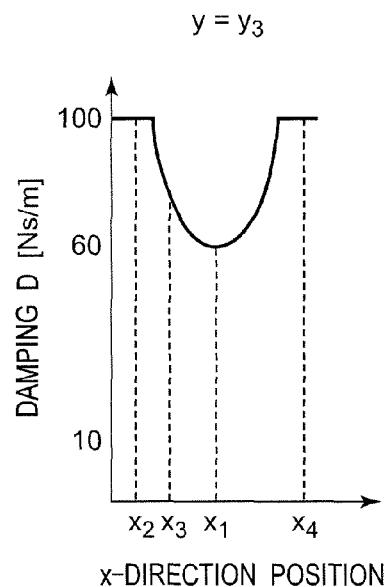
FIG. 12C is a view describing the distribution of damping D in x-direction where $y=y_3$, in a work region of the hand of the robot according to the first embodiment.
Figure 12D:
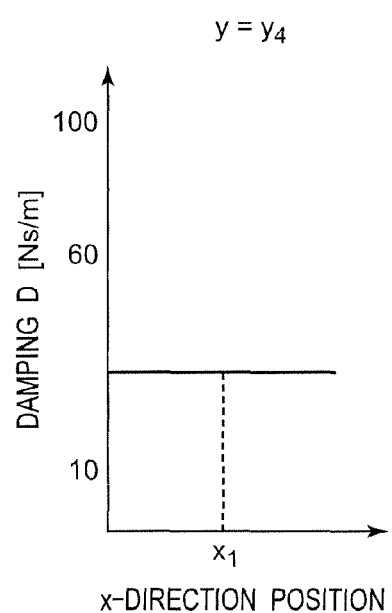
FIG. 12D is a view describing the distribution of damping D in x-direction where $y=y_4$, in a work region of the hand of the robot according to the first embodiment.
Figure 12E:
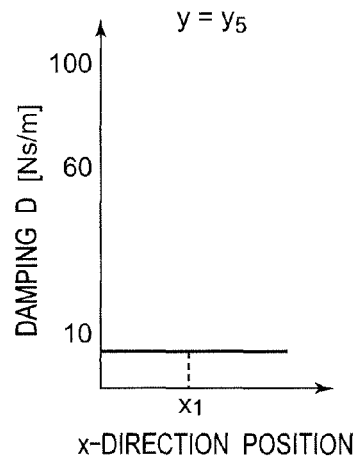
FIG. 12E is a view describing the distribution of damping D in x-direction where $y=y_5$, in a work region of the hand of the robot according to the first embodiment.
Figure 12F:
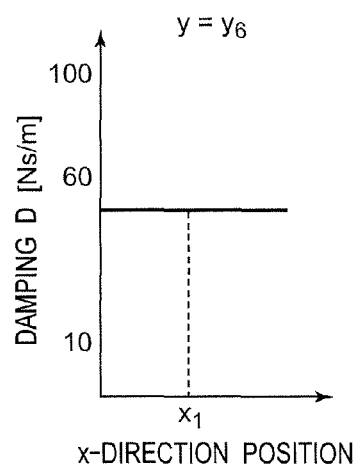
FIG. 12F is a view for describing the distribution of damping D in x-direction where $y=y_6$, in a work region of the hand of the robot according to the first embodiment.
Figure 12G:
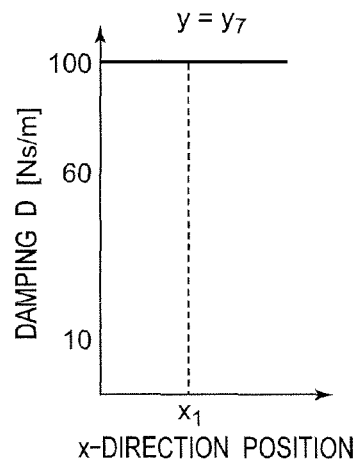
FIG. 12G is a view for describing the distribution of damping D in x-direction where $y=y_7$, in a work region of the hand of the robot according to the first embodiment.

In the third embodiment, as shown in FIG. 10A, in the initial state of the impedance map storage unit 48, a second wall 54A, whose damping D is high near the stand 33 of the second workbench 32, is formed as the fourth region 104. More specifically, the initial state of the impedance map storage unit 48, that is, the impedance map of the reference distribution (the distribution serving as the reference before any changed or update is made, or the distribution in the initial state) of the impedance parameters M, D, and K (inertia M, damping D, and stiffness K) stored in the impedance map storage unit 48 has: a first region 101 of low damping for allowing the hand 6 of the robot arm 5 to shift; and a second region 102 of higher damping than that of the first region 101 for allowing the hand 6 to be positioned. Further, between the second region 102 and the first region 101, a fourth region 104, whose damping is higher than that of the first region 101 and equal to or lower than that of the second region 102, for allowing the hand 6 to be positioned (e.g., in FIG. 10A, the damping equal to that of the second region 102) is set. As to the fourth region 104, when the hand 6 enters the fourth region 104, the impedance map variable unit 50 can change the damping of the fourth region 104 to be greater than the initial state. Strictly, in FIG. 10A, a transition region is present between the first region 101 and the fourth region 104. The reason why the transition region is arranged in this manner is to prevent the following situation. When the impedance parameters are set to change stepwise, the control abruptly changes when the boundary is crossed. This may provide a shock to the user, or under a poor condition, the control system becomes unstable and vibration may occur. On the other hand, in the case where no transition region is provided, and the fourth region 104 is adjacent to the first region 101, the values may be set to gradually vary so as to smoothly continue at the peripheral part of each region, in order to prevent the foregoing problems.

The impedance map variable unit 50 changes the damping of the fourth region 104 to be higher than that of the second region 102 after the hand 6 enters the fourth region 104, so as to facilitate positioning of the hand 6.

That is, when the work similarly to that in the first embodiment is started and the arm end of the robot arm 5 shifts to reach the second wall 54A of damping D (i.e., when the fourth region 104 is entered), as shown in FIG. 103, the impedance map variable means 50 updates the parameters of the impedance map storage unit 48 to raise the height (corresponding to the magnitude of the damping of the fourth region 104) of the second wall 54A of damping D (see arrow W), such that the damping of the fourth region 104 becomes higher than the damping before the reach of the arm end of the robot arm 5, in proportional to the shift velocity of the arm end of the robot arm 5, based on the following Formula (6).

$$D = K_D \dot{y} \quad (6)$$

where $K_D$ is a constant of proportion, and $\dot{y}$ is the shift velocity of the arm end in y-direction. The shift velocity of the arm end can be obtained by the velocity calculation unit 60 differentiating the positional information of the arm end of the robot arm 5. The velocity calculation unit 60 is arranged in the impedance control means 4 (see FIG. 2). The velocity calculation unit 60 receives the current arm end position and orientation vector r of the robot arm 5 from the forward kinematics calculation means 26, and provides the obtained velocity to the impedance map variable means 50.

According to the updating method of the impedance map storage unit 48 performed by the impedance map variable means 50 of the third embodiment, the impedance map variable means 50 raises the height (the damping of the fourth region 104) of the damping D of the second wall 54A in accordance with the current positional information of the arm end of the robot arm 5 and the velocity acquired by the velocity calculation unit 60 so as to be proportional to the shift velocity of the arm end of the robot arm 5, whereby the velocity of the arm end of the robot arm 5 is appropriately decelerated, and positioning relative to the stand 33 is further facilitated.

Fourth Embodiment

The basic structure of a robot 1 according to a fourth embodiment of the present disclosure is identical to that according to the first embodiment shown in FIGS. 1 and 2. Therefore, the description of the common parts will not be repeated, and the difference will solely be detailed below.

The work content of the fourth embodiment is the operation including; performing the work according to the first embodiment shown in FIG. 4; inserting the stand 33 of the second workbench 32 into the insertion holes 47 of the flat type television set 46 gripped by the hand 6; thereafter releasing the hand 6; and returning the hand 6 again above the first workbench 31.

Figure 14A:
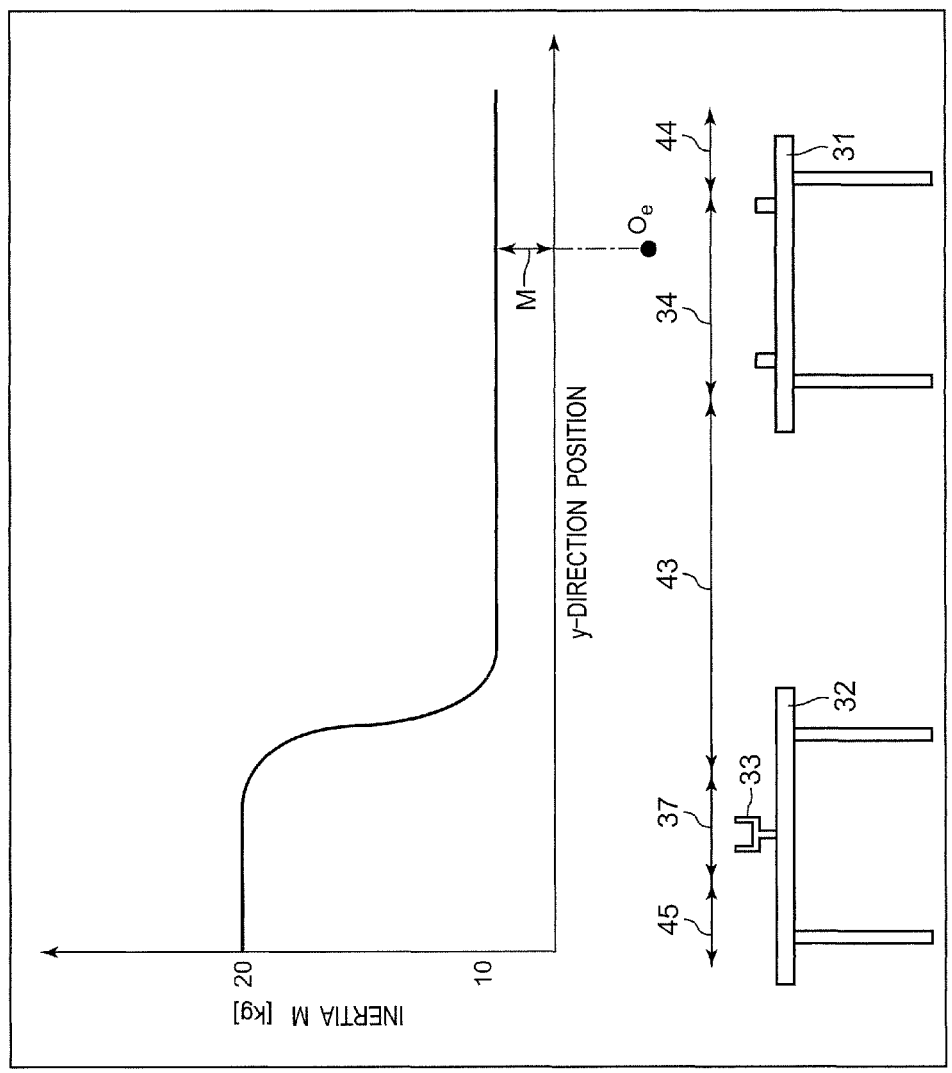
FIG. 14A is a view describing an updating method of the distribution of inertia M by an impedance map variable means according to a fourth embodiment.

In the fourth embodiment, the impedance map variable means 50 changes not only damping D but also inertia M. As shown in FIG. 14A, in the initial state of the impedance map storage unit 48, inertia M is set to a high value, e.g., 20 kg near the stand 33 (the second workbench region 37 and the outer region 45 of the second workbench region 37), and set to a low value, e.g., 5 kg, in the other regions. Here, inertia M depends on how the user feels the absolute value. The value of the inertia corresponds to mass. For example, when the value of inertia is set to 5 kg, the user will feel the sense of moving an object weighing 5 kg. Thus, the user 39 will have the operational feeling of easier maneuverability of shifting. However, when the value of inertia is set to 100 kg, it is difficult for the user to move an object weighing 100 kg. Therefore, the user will have the operational feeling of difficult maneuverability.

With the initial distribution (reference distribution) of inertia M shown in FIG. 14A, when the robot arm 5 is to be shifted from the first workbench 31 to the second workbench 32 (see arrows A and B in FIG. 4), since the value of inertia M is small, the robot arm 5 operates with a small force. Accordingly, the operational feeling becomes light, and the robot arm 5 can easily be shifted. Further, when the positioning of the stand 33 at the second workbench 32 is to be performed, the operation of the robot arm 5 is stabilized because of great inertia M, and positioning work is facilitated.

Figure 14B:
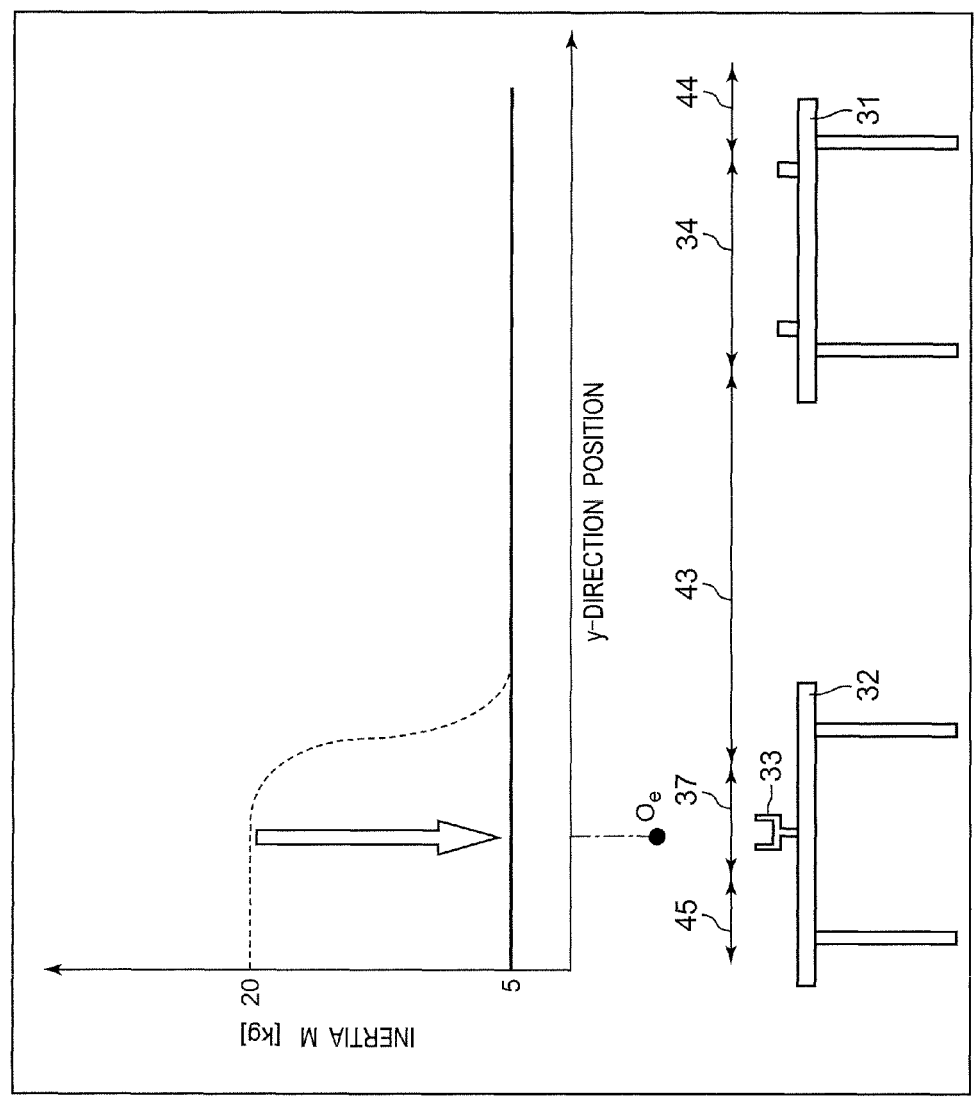
FIG. 14B is a view describing an updating method of the distribution of inertia M by the impedance map variable means according to the fourth embodiment.

In the fourth embodiment, when the work of inserting the flat type television set 46 into the stand 33 is completed (this completion can be determined by the information of the arm end position of the robot arm 5), as shown in FIG. 14B, inertia M near the stand 33 is lowered, e.g., from 20 kg, to 5 kg, by the impedance map variable means 50 (see the downward arrow). Thus, the operation of returning from the second workbench 32 to the first workbench 31 can be performed with a light force, whereby the maneuverability improves.

In the foregoing, the description has been given of the present disclosure through the first to fourth embodiments. In the present disclosure, since the impedance map variable means 50 can update the impedance map in the impedance map storage unit 48 based on the current arm end position of the robot arm 5, no complicated processing such as the determination algorithm of the work phase is required. Further, thanks to little erroneous discernment, the optimum impedance parameters can stably be set based on the simple algorithm, whereby the maneuverability of the work can be improved.

Further, when the present disclosure is to be applied to works other than the conveyance of the object or the insertion work shown in FIG. 4, the present disclosure can be addressed by changing the parameter distribution (reference distribution) in the impedance map storage unit 48 and the updating method of the impedance map storage unit 48 performed by the impedance map variable means 50. As compared to the work phase-based method with which many parameters such as position, velocity, and acceleration must be taken into consideration, application of the present disclosure to other works is easier.

Further, with the present disclosure, not only a minimum (the damping valley 55) of damping is provided, but also the resistance to the reversion operation is increased by dynamically moving the damping walls 54 and 54A. Therefore, any effect in addition to the improvement in maneuverability of the positioning operation such as prevention of erroneous manipulation can be achieved.

Further, not only the minimum of damping (the damping valley 55) is provided, but also the characteristic such as the width or depth of the minimum (the damping valley 55) of damping can be changed in accordance with the current position of the arm end of the robot arm 5. Therefore, a further improvement in maneuverability in positioning can be achieved.

It is to be noted that, though the description has been given of the first and the second embodiment separately, it is also possible to combine the first and second embodiments. For example, after the state shown in FIG. 6B, as shown in FIG. 13, the impedance map variable means 50 can change the distribution of damping D in the direction narrowing the width of valley 55 of damping D (see arrow W1) and in the direction increasing the depth of the valley 55 of damping D (see arrow W2).

It is to be noted that, though the description has been given of the present disclosure based on the first to fourth embodiments, it goes without saying that the present disclosure is not limited to the first to fourth embodiments. The following case is also included in the present disclosure.

Specifically, the control apparatuses are each a computer system structured by a microprocessor, ROM, RAM, a hard disk unit, a display unit, a keyboard, a mouse, and the like. The RAM or the hard disk unit stores a computer program. By the microprocessor operating in accordance with the computer program, the devices can achieve their respective functions. Here, the computer program refers to the combination of a plurality of instruction codes representing the commands to the computer for achieving a prescribed function.

For example, by the program executing unit such as a CPU reading and executing the software program stored in the recording medium such as a hard disk or a semiconductor memory, the constituents can be realized. It is to be noted that the software realizing the control apparatuses according to the embodiments is the program as follows. That is, the program is a robot control program that causes a computer to function as:

an impedance map storage unit that stores, as an impedance map, a reference distribution of impedance parameters, the reference distribution of the impedance parameters associating positions of an arm end of a multi-joint robot arm shifting in accordance with an operation of the multi-joint robot arm with the impedance parameters including inertia, damping, and stiffness at each of the positions;

an impedance map variable unit that changes, in accordance with information of a current position of the arm end of the multi-joint robot arm, the distribution of the impedance parameters at one of a pre-position and a post-position relative to the position of the arm end performing an operation of the multi-joint robot arm with reference to the reference distribution of the impedance parameters in the impedance map; and an impedance control unit that exerts impedance control over the multi-joint robot arm based on an external force acquired by an external force acquiring unit arranged at the multi-joint robot arm and the distribution of the impedance parameters changed by the impedance map variable unit.

Further, the program may be executed as being downloaded from a server or the like. Alternatively, the program may be recorded on a prescribed recording medium (e.g., an optical disc such as a CD-ROM, a magnetic disc, a semiconductor memory or the like) and may be executed by being read.

Still further, the computer that executes the program may be one in number or may be a plurality of computers. That is, the program may be performed by centralized processing or distributed processing.

By properly combining arbitrary embodiment (s) or variation (s) of the aforementioned various embodiments and variations, the effects owned by each of them can be made effectual.

INDUSTRIAL APPLICABILITY

With the robot, the robot control apparatus, the robot control method, and the robot control program of the present disclosure, optimum impedance parameters can stably be set based on a simple algorithm and maneuverability of work can be improved. Therefore, they are useful as a robot such as a human cooperative robot, which assists in works such as power assist in factorys, at homes, or nursing care sites, and a control apparatus of the robot, a control method of the robot, and a control program of the robot.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

The invention claimed is:

1. A robot control method, comprising:
acquiring an external force by an external force acquiring unit arranged at a multi joint robot arm;
storing in an impedance map storage unit, as an impedance map, a reference distribution of impedance parameters, the reference distribution of the impedance parameters associating positions of an arm end of the multi joint robot arm shifting in accordance with an operation of the multi joint robot arm with the impedance parameters including inertia, damping, and stiffness at each of the positions;
changing, by an impedance map variable unit executed by a computer and in accordance with information of a current position of the arm end of the multi joint robot arm, a distribution of the impedance parameters at one of a pre-position and a post-position relative to the position performing an operation of the multi joint robot arm with reference to the reference distribution of the impedance parameters in the impedance map; and
exerting impedance control, by an impedance control unit, over the multi joint robot arm based on the external force acquired by the external force acquiring unit and the distribution of the impedance parameters changed by the impedance map variable unit.

2. A non-transitory computer-readable recording medium including a robot control program for causing a computer to function as:
an impedance map storage unit that stores, as an impedance map, a reference distribution of impedance parameters, the reference distribution of the impedance parameters associating positions of an arm end of a multi joint robot arm shifting in accordance with an operation of the multi joint robot arm with the impedance parameters including inertia, damping, and stiffness at each of the positions;
an impedance map variable unit that changes, in accordance with information of a current position of the arm end of the multi joint robot arm, a distribution of the impedance parameters at one of a pre-position and a post-position relative to the position of the arm end performing an operation of the multi joint robot arm with reference to the reference distribution of the impedance parameters in the impedance map; and
an impedance control unit that exerts impedance control over the multi joint robot arm based on an external force acquired by an external force acquiring unit arranged at the multi joint robot arm and the distribution of the impedance parameters changed by the impedance map variable unit.

3. A robot control apparatus, comprising:
a non-transitory impedance map storage unit that stores, as an impedance map, a reference distribution of impedance parameters, the reference distribution of the impedance parameters associating positions of an arm end of a multi joint robot arm shifting in accordance with an operation of the multi joint robot arm with the impedance parameters including inertia, damping, and stiffness at each of the positions;
an impedance map variable unit that changes, in accordance with information of a current position of the arm end of the multi joint robot arm, a distribution of the impedance parameters at one of a pre-position and a post-position relative to the position of the arm end performing an operation of the multi joint robot arm with reference to the reference distribution of the impedance parameters in the impedance map; and
an impedance control unit that exerts impedance control over the multi joint robot arm based on an external force acquired by an external force acquiring unit arranged at the multi joint robot arm and the distribution of impedance parameters changed by the impedance map variable unit.

4. A robot, comprising:
a multi joint robot arm;
an external force acquiring unit that is arranged at the multi joint robot arm to acquire an external force;
an impedance map storage unit that stores, as an impedance map, a reference distribution of impedance parameters, the reference distribution of the impedance parameters associating positions of an arm end of the multi joint robot arm shifting in accordance with an operation of the multi joint robot arm with the impedance parameters including inertia, damping, and stiffness at each of the positions;
an impedance map variable unit that changes, in accordance with information of a current position of the arm end of the multi joint robot arm, the distribution of the impedance parameters at one of a pre-position and a post-position relative to the position of the arm end performing an operation of the multi joint robot arm with reference to the reference distribution of the impedance parameters in the impedance map; and an impedance control unit that exerts impedance control over the multi joint robot arm based on the external force acquired by the external force acquiring unit and the distribution of the impedance parameters changed by the impedance map variable unit.

5. The robot according to claim 4, further comprising
a velocity calculation unit that obtains a velocity by differentiating information of the positions of the arm end of the multi joint robot arm, wherein
the impedance map variable unit changes, in accordance with the information of the current position of the arm end of the multi joint robot arm and the velocity acquired by the velocity calculation unit, the distribution of the impedance parameters at one of a pre-position and a post-position relative to the position of the arm end where the arm end performs the operation of the multi joint robot arm with reference to the reference distribution of the impedance parameters in the impedance map.

6. The robot according to claim 4, wherein
at a position where the arm end of the multi joint robot arm passes, the impedance map variable unit changes a value of the damping of the impedance parameter such that the value of the damping becomes higher after the arm end of the multi joint robot arm has passed the position than a value of the damping before the arm end of the multi joint robot arm has passed the position.

7. The robot according to claim 6, wherein
at the position where the arm end of the multi joint robot arm has passed, the impedance map variable unit raises a value of the damping after the arm end of the multi joint robot arm has passed the position, and thereafter, at the position, the impedance map variable unit lowers the value of the damping to a value lower than a raised damping value, when the arm end of the multi joint robot arm is away from the position by a certain distance.

8. The robot according to claim 4, wherein
the impedance map stored in the impedance map storage unit has a first region of a low damping for allowing the arm end of the multi joint robot arm to be shifted, a second region of a higher damping than the damping of the first region for allowing the arm end of the multi joint robot arm to be positioned, and a third region of a higher damping than the damping of the second region, the third region being arranged so as to surround the second region, and the impedance map variable unit changes an area of the second region surrounded by the third region, after the arm end of the multi joint robot arm has entered the second region, to be smaller than an area before entrance of the arm end to the second region.

9. The robot according to claim 8, wherein
the impedance map variable unit changes a damping value of the second region, after the arm end of the multi joint robot arm has entered the second region, toward a damping value lower than a damping value before the entrance of the arm end to the second region.

10. The robot according to claim 4, wherein
the impedance map stored in the impedance map storage unit has a first region of a low damping for allowing the arm end of the multi joint robot arm to be shifted, and a second region of a higher damping than the damping of the first region for allowing the arm end to be positioned, wherein a third region of a higher damping than the damping of the first region and being equal to or smaller than the damping of the second region is set, the third region being for allowing the arm end to be positioned between the second region and the first region, and
the impedance map variable unit changes the damping of the third region, after the arm end has entered the third region, to be higher than the damping of the second region.

11. The robot according to claim 10, further comprising
a velocity calculation unit that obtains a velocity by differentiating information of the positions of the arm end of the multi joint robot arm, wherein
the impedance map variable unit sets a height of the damping of the third region, in accordance with the information of the current position of the arm end of the multi joint robot arm, and a velocity at which the arm end of the multi joint robot arm enters the third region, the velocity being the velocity acquired by the velocity calculation unit.

* * * * *